US012690670B2

(12) United States Patent
Wright et al.

(10) Patent No.: US 12,690,670 B2
(45) Date of Patent: Jul. 28, 2026

(54) ADJUSTABLE DESK AND MONITOR MOUNT ASSEMBLY

(71) Applicant: Wright Manufacturing LLC, Prospect, KY (US)

(72) Inventors: R. Aaron Wright, Prospect, KY (US); Gianna Riccardi, Nashville, TN (US); Blake Wolf, Nashville, TN (US); Jordan Harrison, Nashville, TN (US); Evan Reese, Nashville, TN (US); Nick Papageorge, Atlanta, GA (US)

(73) Assignee: WRIGHT MANUFACTURING LLC, Prospect, KY (US)

( * ) Notice: Subject to any disclaimer, the term of this patent is extended or adjusted under 35 U.S.C. 154(b) by 175 days.

(21) Appl. No.: 18/640,776

(22) Filed: Apr. 19, 2024

(65) Prior Publication Data

US 2024/0349886 A1 Oct. 24, 2024

Related U.S. Application Data

(60) Provisional application No. 63/497,533, filed on Apr. 21, 2023.

(51) Int. Cl.
*A47B 21/03* (2006.01)
*F16M 11/08* (2006.01)
*F16M 11/12* (2006.01)

(52) U.S. Cl.
CPC ......... *A47B 21/0314* (2013.01); *F16M 11/08* (2013.01); *F16M 11/125* (2013.01); *A47B 2021/0364* (2013.01); *F16M 2200/04* (2013.01)

(58) Field of Classification Search
CPC ........ A47B 21/0314; A47B 2021/0364; A47B 17/02; A47B 19/06; A47B 2200/0042; A47B 2200/0043
See application file for complete search history.

(56) References Cited

U.S. PATENT DOCUMENTS

| | | | | |
|---|---|---|---|---|
| 6,142,459 | A * | 11/2000 | Garrett | B25H 1/18 |
| | | | | 269/69 |
| 6,712,008 | B1 * | 3/2004 | Habenicht | A47B 21/0314 |
| | | | | 108/50.01 |
| 6,874,431 | B1 | 4/2005 | Danna | |
| 7,690,317 | B2 | 4/2010 | Beck et al. | |
| 7,721,658 | B2 | 5/2010 | Seeley et al. | |
| 7,823,973 | B2 | 11/2010 | Dragusin | |
| 7,908,978 | B1 | 3/2011 | Pelton, Jr. | |
| 8,141,949 | B2 | 3/2012 | Baru | |

(Continued)

FOREIGN PATENT DOCUMENTS

| | | |
|---|---|---|
| CA | 2896078 C | 9/2015 |
| CN | 201164192 Y | 12/2008 |

(Continued)

*Primary Examiner* — Arfan Y. Sinaki
(74) *Attorney, Agent, or Firm* — Stites & Harbison, PLLC; James R. Hayne

(57) ABSTRACT

An adjustable desk and monitor mount assembly includes an L-shaped base having a first leg configured to be positioned behind a chair and a second leg configured to be positioned along a side of the chair. A vertical support extends upward from the second leg, a desk arm is pivotally connected to the vertical support, and a monitor arm is rotationally connected to the vertical support. A desk is operably connected to the desk arm, and a monitor mount is operably connected to the monitor arm.

11 Claims, 25 Drawing Sheets

(56)     References Cited

U.S. PATENT DOCUMENTS

| | | | | |
|---|---|---|---|---|
| 8,371,237 B2 | 2/2013 | Weber | | |
| 8,939,500 B2 | 1/2015 | Voigt et al. | | |
| 9,016,213 B2 * | 4/2015 | Tajbakhsh | ............. | A47B 21/00 |
| | | | | 108/103 |
| 9,164,537 B2 | 10/2015 | Tsen et al. | | |
| 9,220,348 B2 | 12/2015 | Stieler et al. | | |
| 9,549,609 B2 | 1/2017 | Constantino et al. | | |
| 9,596,929 B2 | 3/2017 | Koulizakis | | |
| 9,980,561 B1 | 5/2018 | Constantino et al. | | |
| 10,004,327 B2 * | 6/2018 | McRorie, III | ......... | F16M 11/30 |
| 10,010,169 B2 | 7/2018 | Grotenhuis | | |
| 10,390,610 B2 | 8/2019 | Nelson | | |
| 10,441,072 B2 | 10/2019 | Gomez Nebot | | |
| 11,116,315 B2 | 9/2021 | Hoffman | | |
| 2010/0201165 A1 * | 8/2010 | Dankovich | ............. | A47C 7/38 |
| | | | | 248/398 |
| 2012/0248263 A1 * | 10/2012 | Grotenhuis | ........... | A47B 21/02 |
| | | | | 248/123.2 |
| 2013/0146728 A1 * | 6/2013 | Ergun | ................... | A47B 21/02 |
| | | | | 248/299.1 |

FOREIGN PATENT DOCUMENTS

| | | | | | | |
|---|---|---|---|---|---|---|
| CN | 204176271 | U | * | 2/2015 | | |
| CN | 103477143 | B | | 9/2016 | | |
| CN | 104918516 | B | | 6/2017 | | |
| CN | 211483389 | U | | 9/2020 | | |
| DE | 202006007126 | U1 | * | 7/2006 | .......... | A47B 23/046 |
| DE | 102007032080 | B4 | | 11/2009 | | |
| DE | 202010006411 | U1 | | 9/2010 | | |
| DE | 202011001311 | U1 | | 3/2011 | | |
| DE | 102012018979 | B4 | | 4/2015 | | |
| EP | 1596687 | B1 | | 3/2007 | | |
| KR | 101794234 | B1 | | 11/2017 | | |
| KR | 20200100308 | A | * | 8/2020 | .............. | A47C 7/68 |
| KR | 102444365 | B1 | | 9/2022 | | |
| TW | 201216896 | A | | 5/2012 | | |

* cited by examiner

ADJUSTABLE DESK AND MONITOR MOUNT ASSEMBLY

CROSS-REFERENCE TO RELATED APPLICATIONS

The present application claims priority to U.S. Patent Application Ser. No. 63/497,533 filed on Apr. 21, 2023, the entire disclosure of which is incorporated herein by reference.

BACKGROUND OF THE INVENTION

Many people spend a significant amount of time in front of computer and television monitors, both for work and entertainment. With the ever increasing popularity of gaming, the time that some people spend looking at a monitor is only increasing. Traditional desks and chairs do not provide the required comfort and ergonomics to allow a user to sit for hours at a time, as is become more and more common. In the past, when the passive consumption of television was the norm, the use of more comfortable chairs, such as armchairs and recliners, would add to the comfort of a user. However, the use of such chairs is not ideal when performing work or gaming. Therefore, there remains a need for an adjustable desk and monitor arrangement that can be positioned with respect to a large comfortable chair, such as a recliner.

SUMMARY OF THE INVENTION

The present invention includes an adjustable desk and monitor mount assembly designed for use in conjunction with a chair, and in particular an adjustable chair such as a recliner. The adjustable desk and monitor mount assembly of the present invention is adjustable in a variety of ways to allow a user to easily get in and out of the chair, adjust a desk for ergonomic use regardless of the configuration of the chair, and adjust a monitor to a preferred viewing angle for a user sitting in the chair regardless of the configuration of the chair According to some exemplary embodiments, an adjustable desk and monitor mount assembly made in accordance with the present invention includes an L-shaped base having a first leg configured to be positioned behind a chair and a second leg configured to be positioned along a side of the chair. A vertical support extends upward from the second leg, a desk arm is pivotally connected to the vertical support with a desk operably connected to the desk arm. A monitor arm having a first end with a counterweight and a second end with a lateral extension is rotationally connected to the vertical support at a point between the first end and the second end, and a monitor mount is operably connected to the monitor arm In some exemplary embodiments, the desk arm is movable between a first position in which the desk arm is configured to be positioned near the chair and a second position in which the desk arm is configured to be positioned away from the chair.

In some exemplary embodiments, the desk arm is further configured to travel along the length of the vertical support.

In some exemplary embodiments, the assembly further includes a traveling housing configured to travel along the vertical support and the desk arm is pivotally connected to the traveling housing. A linear actuator extends between the base and the traveling housing and is configured to control the height of the traveling housing.

In some exemplary embodiments, the desk is connected to the desk arm to allow the desk to rotate.

In some exemplary embodiments, an angle locking mechanism is configured to secure the desk at a plurality of rotational positions.

In some exemplary embodiments, the desk is connected to the desk arm to allow the desk to slide along an axis perpendicular to the desk arm.

In some exemplary embodiments, the desk is connected to the desk arm to allow the desk to rotate. An angle locking mechanism is configured to secure the desk at a plurality of rotational positions, but when the desk is slide along the axis out of a fully retracted position, the angle locking mechanism is disabled.

In some exemplary embodiments, the monitor arm is moveable between a first position in which the monitor arm is positioned in front of the chair and a second position in which the monitor arm is positioned above the chair.

In some exemplary embodiments, a monitor tipping mechanism configured to tip the monitor mount about an axis parallel to the lateral extension of the monitor arm.

In some exemplary embodiments, the monitor tipping mechanism includes a motor, a lead screw turned by the motor, a follower defining a threaded hole that engages threading of the lead screw, and a cam defining a spiraling channel. When the motor turns the lead screw, the follower moves longitudinally along a length of the lead screw and the follower travels within the channel causing the cam to rotate.

DESCRIPTION OF THE DRAWINGS

FIG. 15D illustrates the desk at fourth angled orientation;

DETAILED DESCRIPTION OF THE INVENTION

The present invention includes an adjustable desk and monitor mount assembly designed for use in conjunction with a chair, and in particular an adjustable chair such as a recliner. The adjustable desk and monitor mount assembly of the present invention is adjustable in a variety of ways to allow a user to easily get in and out of the chair, adjust a desk for ergonomic use regardless of the configuration of the chair, and adjust a monitor to a preferred viewing angle for a user sitting in the chair regardless of the configuration of the chair.

Figure 1:
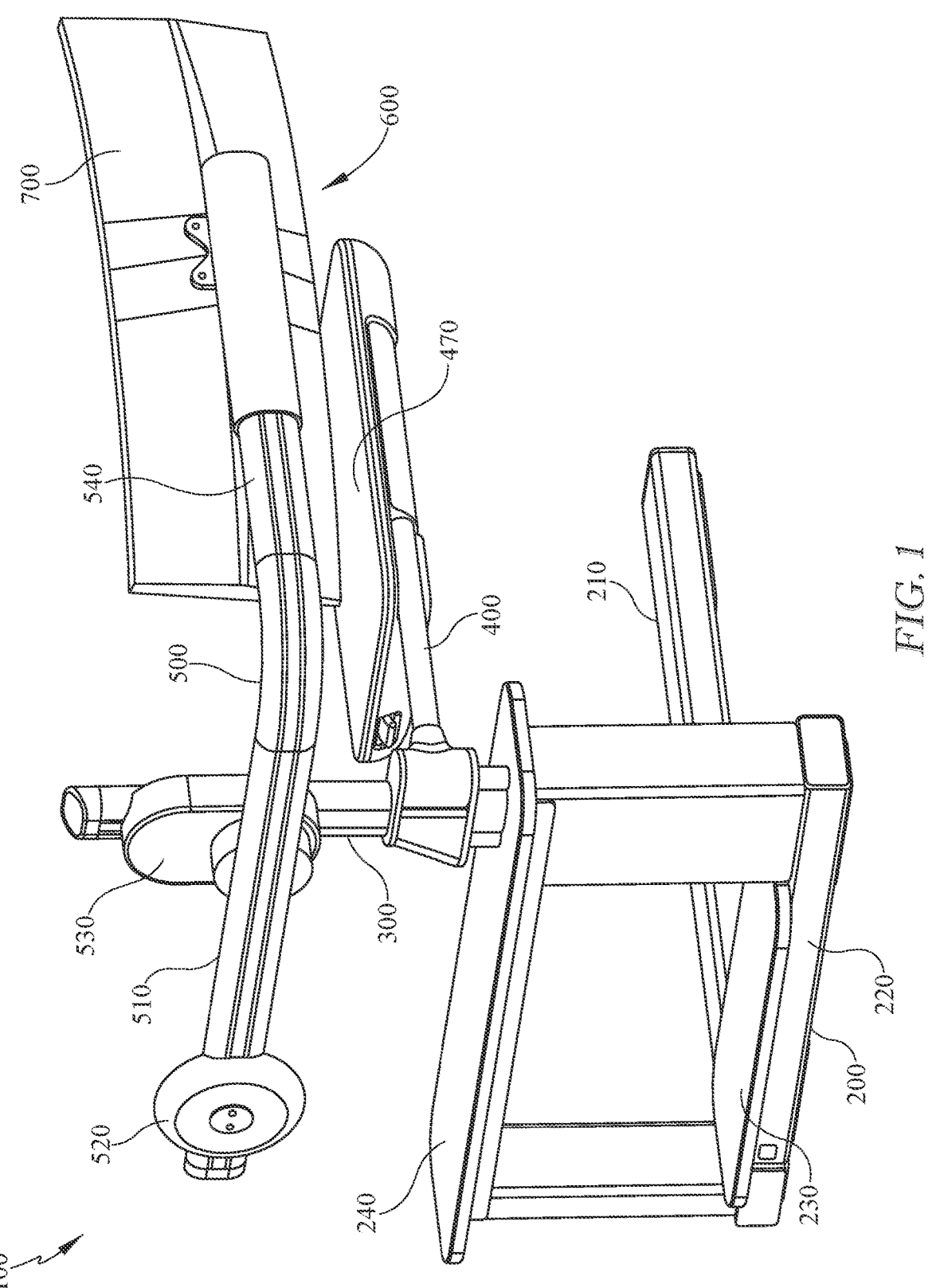
FIG. 1 is a front perspective view of a first exemplary adjustable desk and monitor mount assembly of the present invention.

Referring first to FIG. 1, an exemplary adjustable desk and monitor mount assembly 100 made in accordance of the present invention includes an L-shaped base 200 including a first leg 210 and a second leg 220. A vertical support 300 extends upward from the second leg 220. A desk arm 400 is operably connected to the vertical support 300 to allow the desk arm 400 to move up and down along the vertical support 300 and also pivot relative to the vertical support 300, as discussed further below. A desk 470 is operably connected to the desk arm 400 and moveable between a variety of configurations, as discussed further below.

A monitor arm 500 is also rotationally connected to the vertical support 300 with a counterweight 520 attached to one length 510 of the monitor arm 500 and a lateral extension 540 opposite from the counterweight 520. A monitor 700 is operably connected by a monitor tipping mechanism 600 to the lateral extension 540 of the monitor arm 500. The monitor tipping mechanism 600 is configured to allow the monitor 700 to tip between a variety of configurations, as discussed further below.

Figure 2:
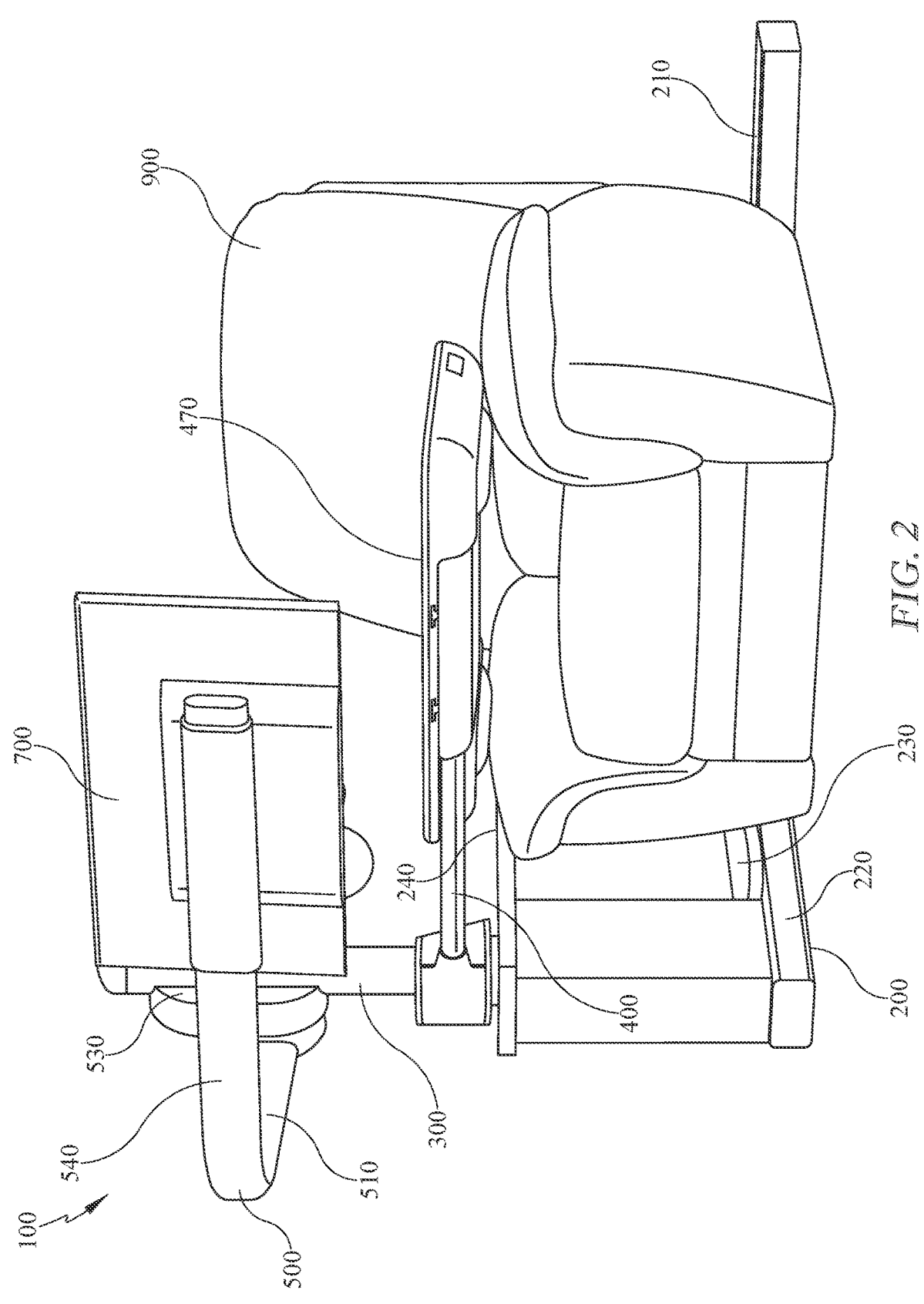
FIG. 2 is another front perspective view of the assembly of FIG. 1 shown in use with a recliner.
Figure 3:
FIG. 3 is a side view of the assembly and recliner of FIG. 2.
Figure 4:
FIG. 4 is a rear perspective view of the assembly and recliner of FIG. 2.
Figure 5:
FIG. 5 is a rear perspective view of the assembly and recliner of FIG. 2 in an alternate configuration.
Figure 6:
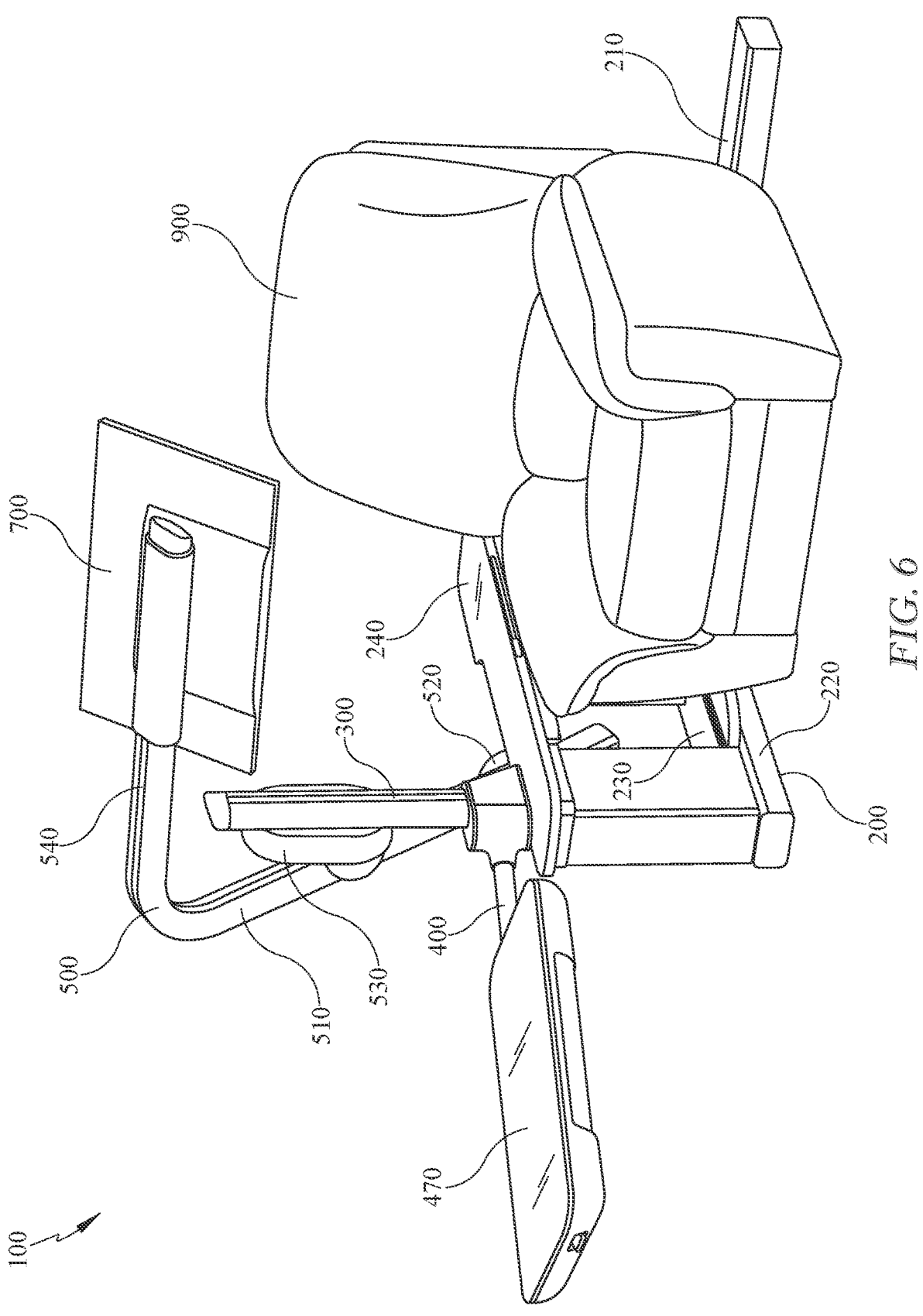
FIG. 6 is a front perspective view of the assembly and recliner of FIG. 2 in an alternate configuration.

Referring now to FIGS. 2-6, according to some implementations, the exemplary assembly 100 is used in conjunction with a chair, such as a recliner 900. As shown in FIGS. 2-6, in use the first leg 210 of the base 200 is positioned behind the recliner 900 and the second leg 220 of the base 200 is positioned along a side of the recliner 900. In FIGS. 2-4, the recliner 900 is in an upright position, the desk 470 is in a first position near the recliner 900 and the monitor arm 500 (and connected monitor 700) is in a first position in front of the recliner 900. The configuration in FIGS. 2-4 is most similar to a typically work desk configuration in which the monitor 700 function as a primary monitor positioned immediately above a substantially horizontal desk 470. In FIG. 5, the desk 470 is once again in the first position in front of the recliner 900, but the recliner 900 is now in a reclined position and the monitor arm 500 has been moved to a second position above the recliner 900 to assist in viewing when a user is reclined. In FIG. 6, the desk 470 is in a second position away from the recliner 900 and the monitor arm 500 is in the raised second position above the recliner 900. The configuration in FIG. 6 allows a user to easily sit down or get up from the recliner 900. The above configurations shown in FIGS. 2-6 and suggested uses are merely exemplary. Upon review of the disclosure that follows, further details and advantages of the assembly 100 will be readily apparent.

Referring still to FIGS. 1-6, as previously mentioned the base 200 is L-shaped with a first leg 210 and a second leg 220 at a substantially right angle. The L-shaped base 200 allows the base 200 to fully support the assembly 100 in all of its various configurations while also allowing easy positioning of a chair (e.g., the recliner 900 shown in FIGS. 2-6) in relation to the assembly 100. However, other configurations of the base are possible without departing from the spirit and scope of the present invention.

As also shown in FIGS. 1-6, the exemplary base 200 further includes a lower side table 230 and an upper side table 240 positioned above and operably connected to the second leg 220 of the base 200. The lower side table 230 is contemplated for a user to place a game console or desktop computer frame while the upper side table 240 is contemplated for a user to use as a general side table. Although the exemplary side tables 230, 240 are shown as fixed to the second leg 220 both in orientation and height, in other embodiments of the present invention, the location, orientation, and height of one or both of the side tables can be adjustable. Furthermore, the number of side tables can also be modified without departing from the spirit and scope of the present invention.

Figure 7:
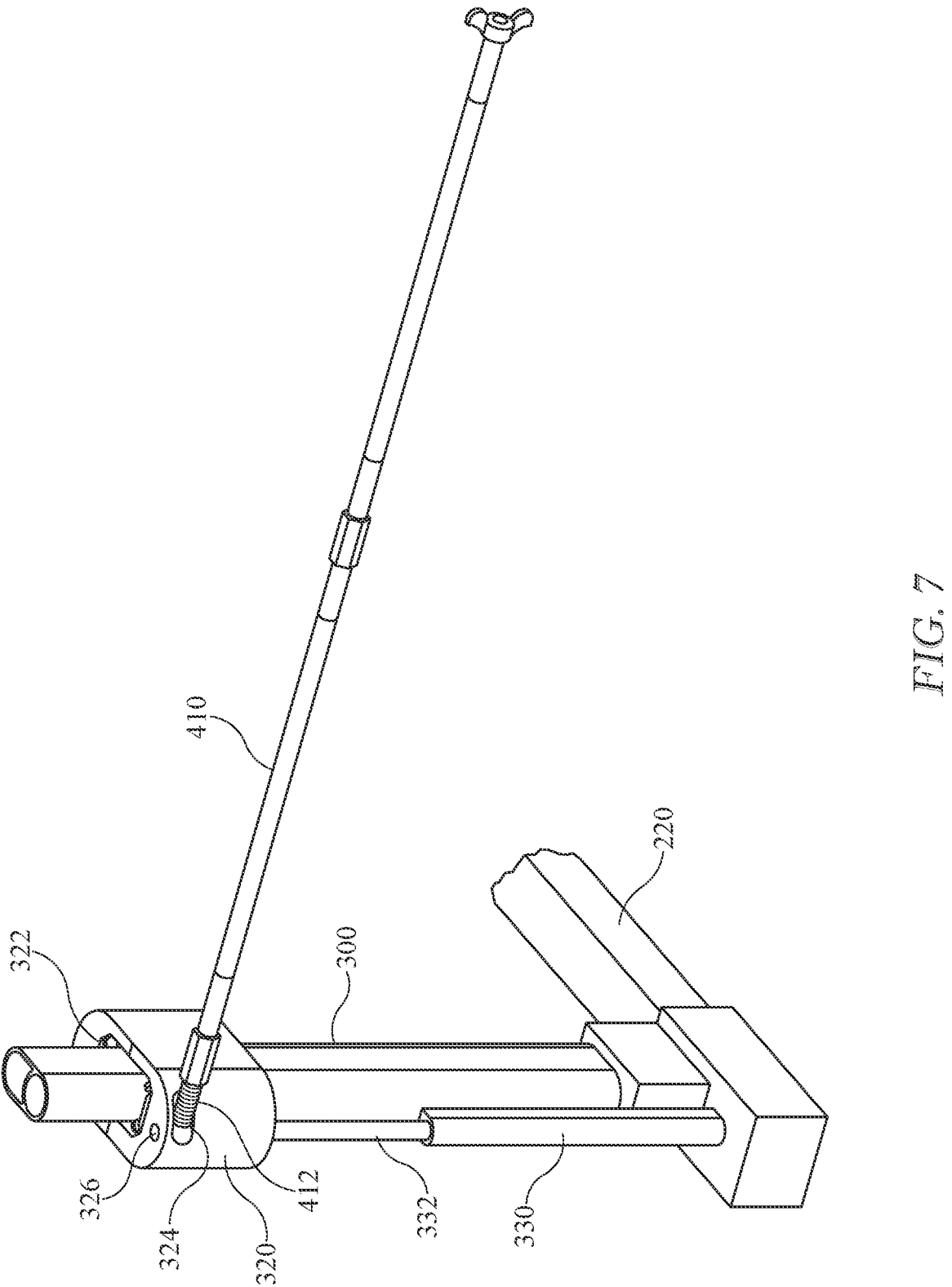
FIG. 7 is a front perspective view of a portion of the base, vertical support, and desk arm with certain components not show to better illustrate operation of the desk arm.
Figure 8:
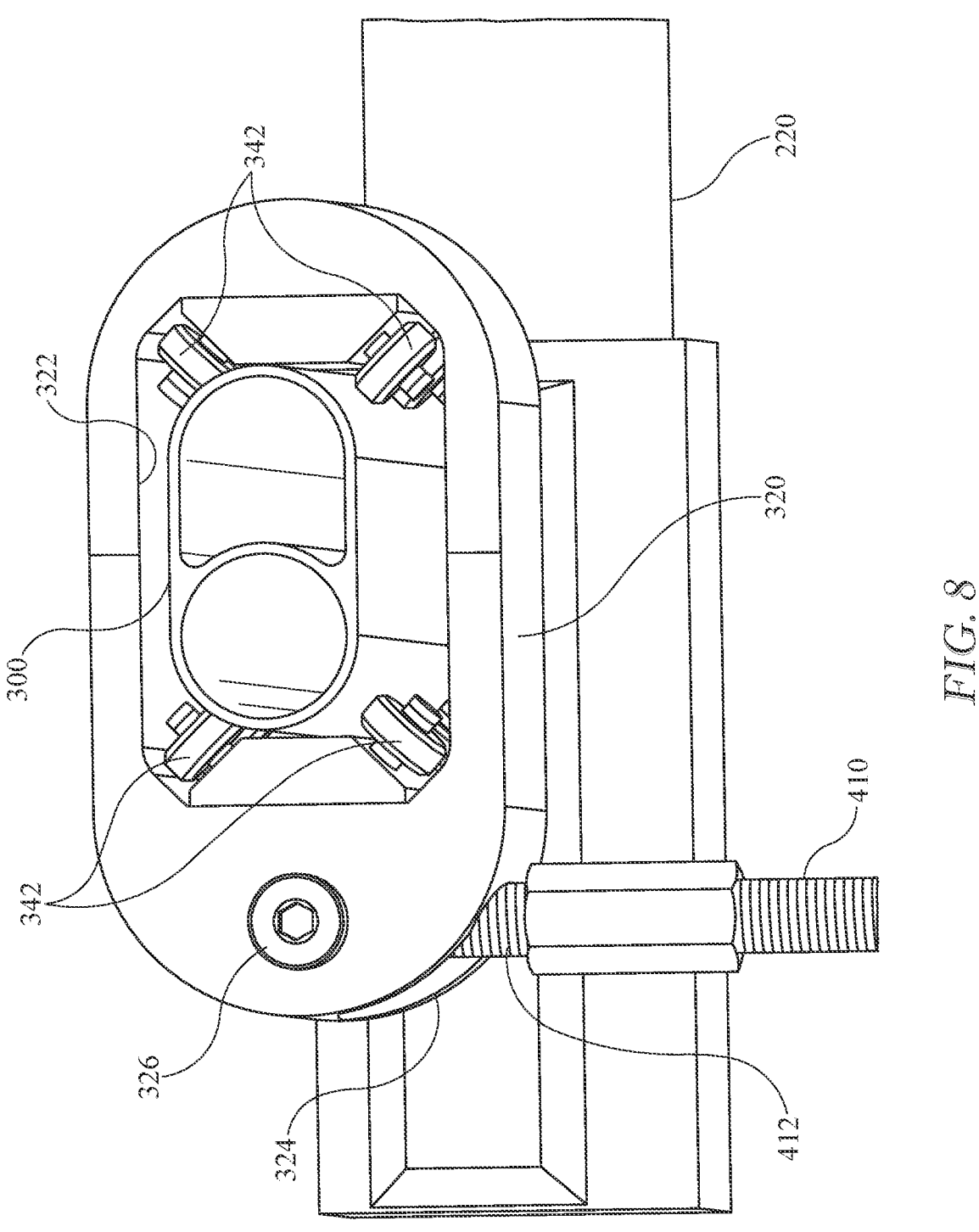
FIG. 8 is a detailed perspective view of the travel housing which is used to move the desk arm vertically along the vertical support.

As previously mentioned, the desk arm 400 is operably connected to the vertical support 300 to allow the desk arm 400 to move up and down along the vertical support 300 and also pivot relative to the vertical support 300. With respect to the vertical movement, and referring now to FIGS. 7-8, an internal bar 410 of the desk arm 400 is pivotally connected to a traveling housing 320 that surrounds the vertical support 300. In particular, the traveling housing 320 defines a channel 322 and the vertical support 300 extends through the channel 322. Furthermore, as shown in FIG. 8, a plurality of wheels 342 are provided within the channel 322 and positioned between the channel 322 and the vertical support 300. The wheels 342 help guide the traveling housing 320 along the length of the channel 322 while limiting frictional forces. As shown in FIG. 7, a linear actuator 330 extends between the second leg 220 of the base 200 with an extendable rod 332 of the linear actuator 330 engaging the bottom of the traveling housing 320. By changing the length of the rod 332 with the linear actuator 330, the height of the traveling housing 320 can be controlled. In some preferred embodiments, the extendable rod 332 is not fixed to the traveling housing 320 and, as such, if the linear actuator 330 is retracting, and the traveling housing 320 meets resistance (i.e., the desk 470 or desk arm 440 encounter a user of chair) the extendable rod 332 can decouple from the traveling housing 320 and the traveling housing 320 and connected desk arm 440 and desk 470 will not continue to descend.

Referring still to FIGS. 7-8, the traveling housing 320 further defines a slot 324 along its side which is configured to retain the end 412 of the internal bar 410 of the desk arm 400 as it pivots relative to the vertical support 300. Specifically, the internal bar 410 can pivot approximately 90° clockwise in FIG. 8 between the first configuration shown in FIGS. 7-8 (reflected in FIG. 1-5 where the desk 450 is in front of the recliner 900) and a second configuration (reflected in FIG. 6 where the desk 450 is positioned away from the recliner 900). To this end, the internal bar 410 is connected to the traveling housing 320 by a bolt 326 which defines the axis about which the internal bar 410 pivots. In this configuration, the slot 324 provides for approximately 90° of movement between the first configuration and the second configuration. However, in other configurations the internal bar 410 (and related desk arm 400) are not necessarily limited to 90°.

As previously mentioned, the monitor arm 500 is rotationally connected to the vertical support 300. Referring once again to FIGS. 1-6, although only two positions of the monitor arm 500 are show, it is contemplated that the monitor arm 500 can move to and be held securely at a variety of different positions. To this end, although not expressly shown, it is contemplated that a housing 530 can include a mechanism capable of rotating the monitor arm 500. For example, in one exemplary implementation, a worm gear is driven by a motor and engages a worm wheel that is operably connected to the monitor arm 500. The use of a worm gear and worm wheel advantageously prevents the monitor arm 500 from unintentionally swinging backward, even if power is lost. Other means of rotating the monitor arm 500 are also contemplated. In any event, the size and location of the counterweight 520 reduce the mechanical load on the means of rotating the monitor arm 500. As such, it is contemplated that in some embodiments the position of the counterweight 520 along the monitor arm 500 can be adjusted to better balance the weight of the monitor 700.

Figure 9:
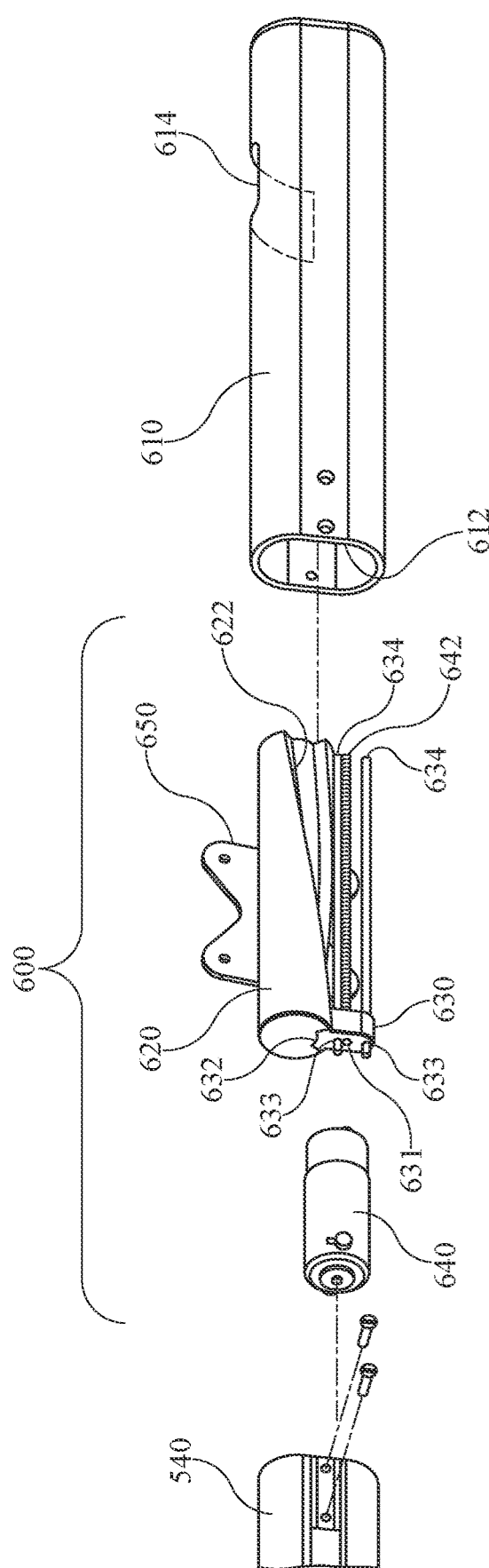
FIG. 9 is an exploded view of the mount tipping mechanism shown in FIG. 1.

As previously mentioned, a monitor 700 is operably connected by a monitor tipping mechanism 600 to the lateral extension 540 which allows the monitor 700 to tip between a variety of configurations. Referring now to FIG. 9, the monitor mount tipping mechanism 600 is contained within a housing 610 which is connected to an end of the monitor arm 540. The housing 610 defines a cavity 612 in which most of the components of the monitor mount tipping mechanism 600 are housed as well as an opening 614 through which a monitor mount 650 extends, as discussed further below.

The monitor tipping mechanism 600 includes a motor 640 which turns a lead screw 642. The monitor tipping mechanism 600 further includes a follower 630 that defines a threaded hole 631 which engages the threading of the lead screw 642. The follower 630 further defines two guide holes 633 through which corresponding guide rails 634 extend. Accordingly, the motor 640 turning the lead screw 642 drives the follower 630 longitudinally along the length of the lead screw 642 and guide rails 634. The monitor tipping mechanism 600 further includes a cam 620 that defines a channel 622 that spirals around the body the of the cam 620. The follower 630 includes a contoured end 632 configured to mate with and travel within the channel 622 of the cam 620. In this way, as the follower 630 moves longitudinally along the length of the lead screw 642 and guide rails 634, the contoured end 632 of the follower 630 travels along the channel 622 of the cam 620, causing the cam 620 to rotate. The monitor mount 650 is fixedly connected to the cam 620 to rotate along with the cam 620.

Figure 10A:
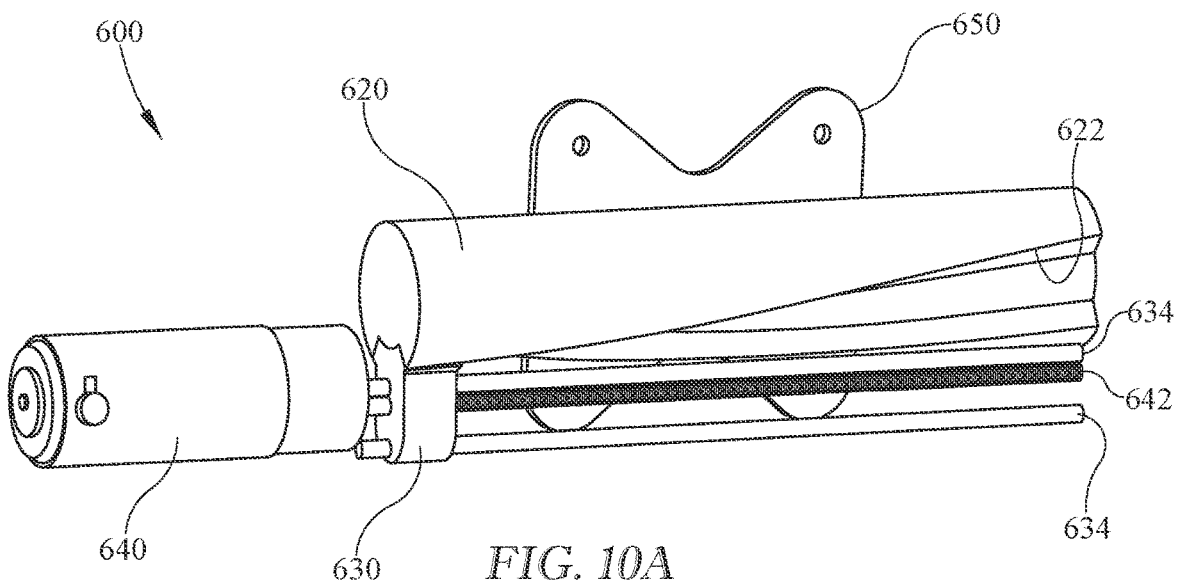
FIG. 10A illustrates the mount tipping mechanism with the monitor mount in a first position.
Figure 10B:
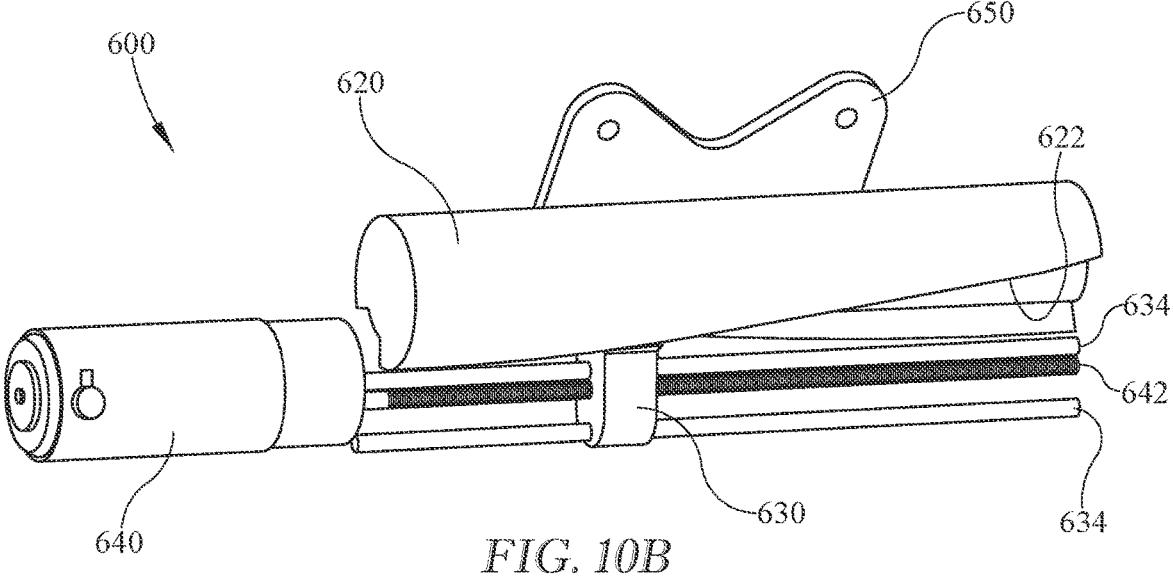
FIG. 10B illustrates the mount tipping mechanism with the monitor mount in a second position.
Figure 10C:
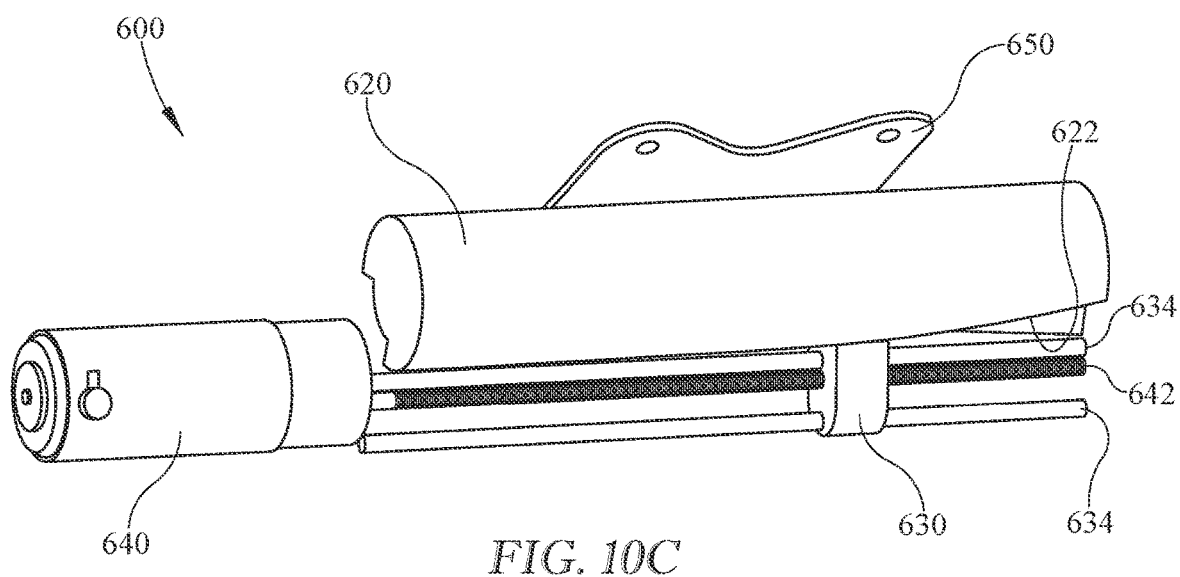
FIG. 10C illustrates the mount tipping mechanism with the monitor mount in a third position.
Figure 10D:
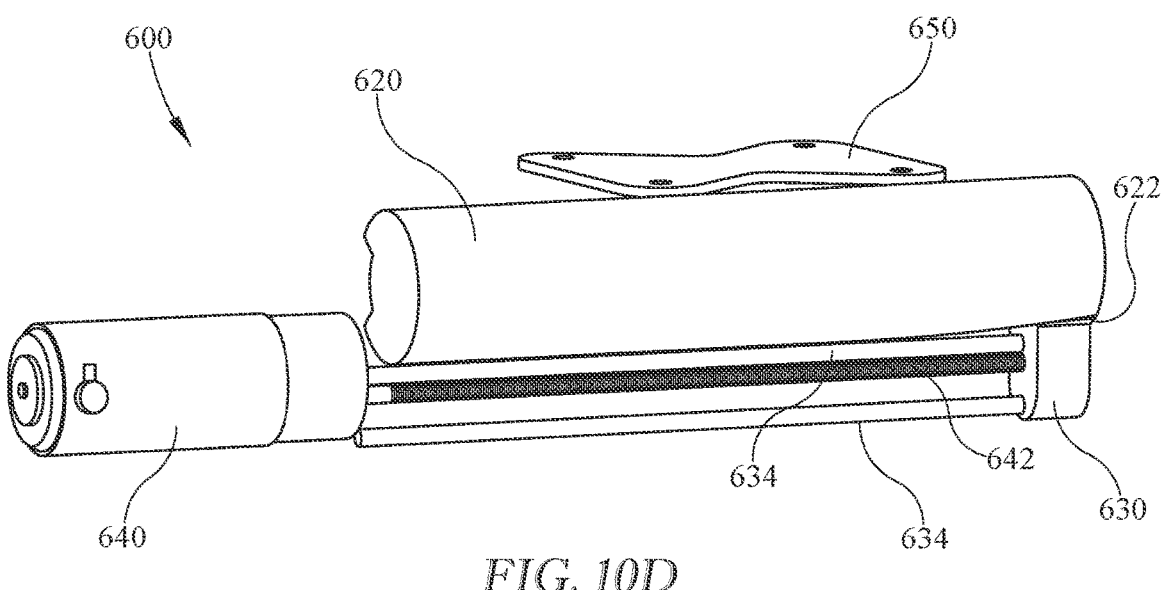
FIG. 10D illustrates the mount tipping mechanism with the monitor mount in a fourth position.

FIGS. 10A-10D illustrate how movement of the cam 620 along the length of the lead screw 642 and guide rails 634 causes rotation of the cam 620 and tipping of the monitor mount 650 about an axis parallel to the lateral extension 540 of the monitor arm 500 between a substantially vertical orientation in FIG. 10A to a substantially horizontal orientation in FIG. 10D. Of course, the use of "vertical" and "horizontal" is only with reference to FIGS. 10A-10D as the actual orientation of the monitor mount 650 (and attached monitor 700) will also depend on the rotational position of the monitor arm 500 relative to the vertical support 300.

Figure 11:
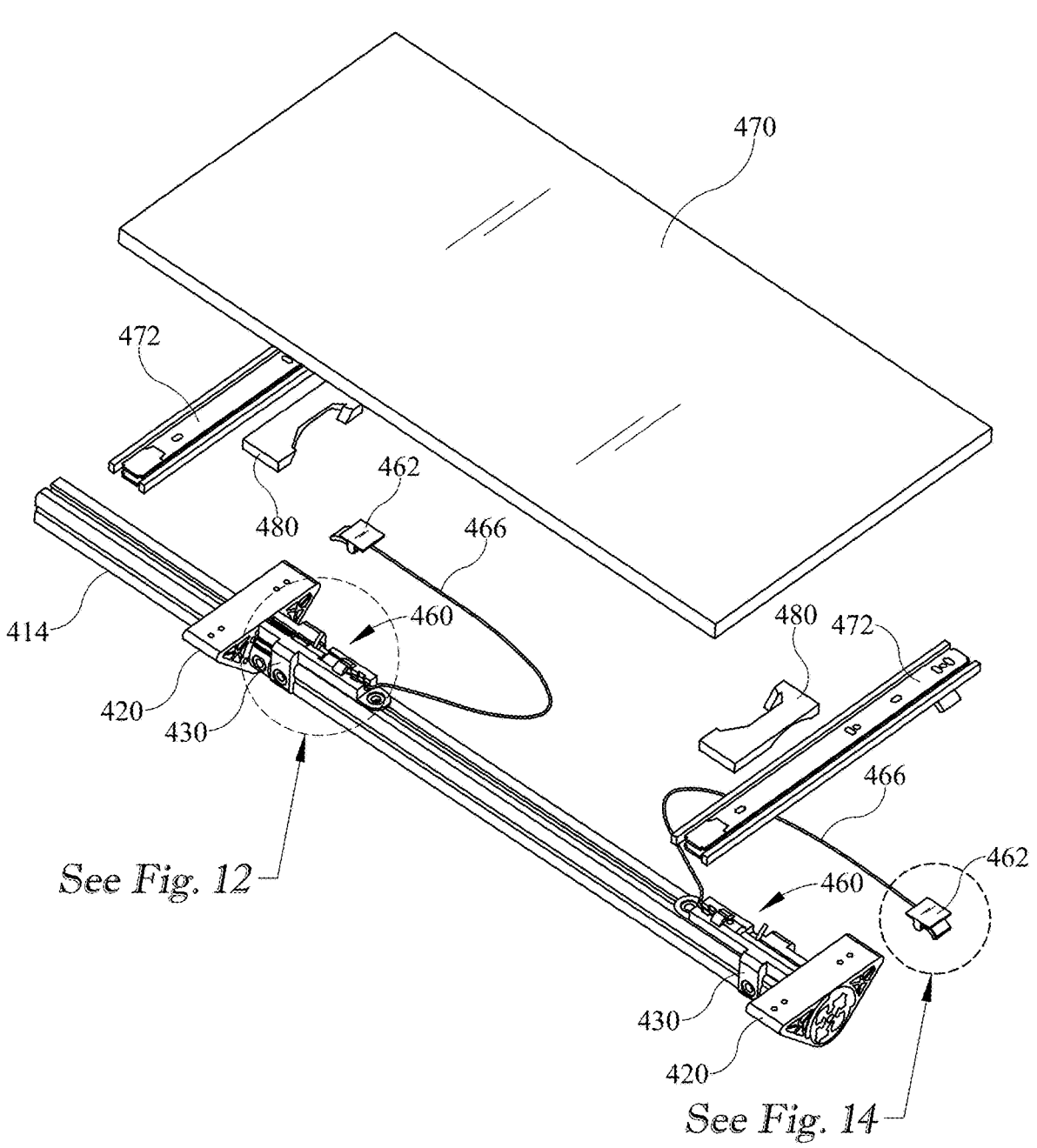
FIG. 11 is an exploded view of the various components that allow the desk to move relative to the desk arm.

As previously mentioned, the desk 470 is operably connected to the desk arm 400 and moveable between a variety of configurations. Referring now to FIGS. 11-14, the exemplary desk arm 400 includes a reinforced support bar 414 which is operably connected to the internal bar 410 shown in FIGS. 7-8. In some embodiments, the internal bar 410 and the reinforced support bar 414 may be a unitary piece. Regardless, the desk 470 is operably connected to the reinforced support bar 414 by several intervening members. Specifically, as shown in FIG. 11, two angle guides 420 are spaced apart on the reinforced support bar 414 slightly less than the width of the desk 470. As perhaps best shown in FIG. 13, the angle guides 420 define a plurality of small locking holes 422a-422e surrounding a channel 424 through which the reinforced support bar 414 extends. Importantly, the channel 424 is configured to allow the angle guides 420 to rotate around the reinforced support bar 414, as discussed below. Slides 472 are mounted to each of the angle guides 420 and also connected to the underside of the desk 470. The slides 472 allow the desk 470 to slide along an axis perpendicular to the desk arm 400. The particular configuration of the slide is not limited, but can be, for example, a ball bearing slide, roller slide, or other such linear motion bearing.

Two spring pin housings 430 is also providing on the reinforced support bar 414 adjacent to the angle guides 420. Unlike the angle guides 420, the spring pin housings 430 are fixedly connected to the reinforced support bar 414.

Figure 12:
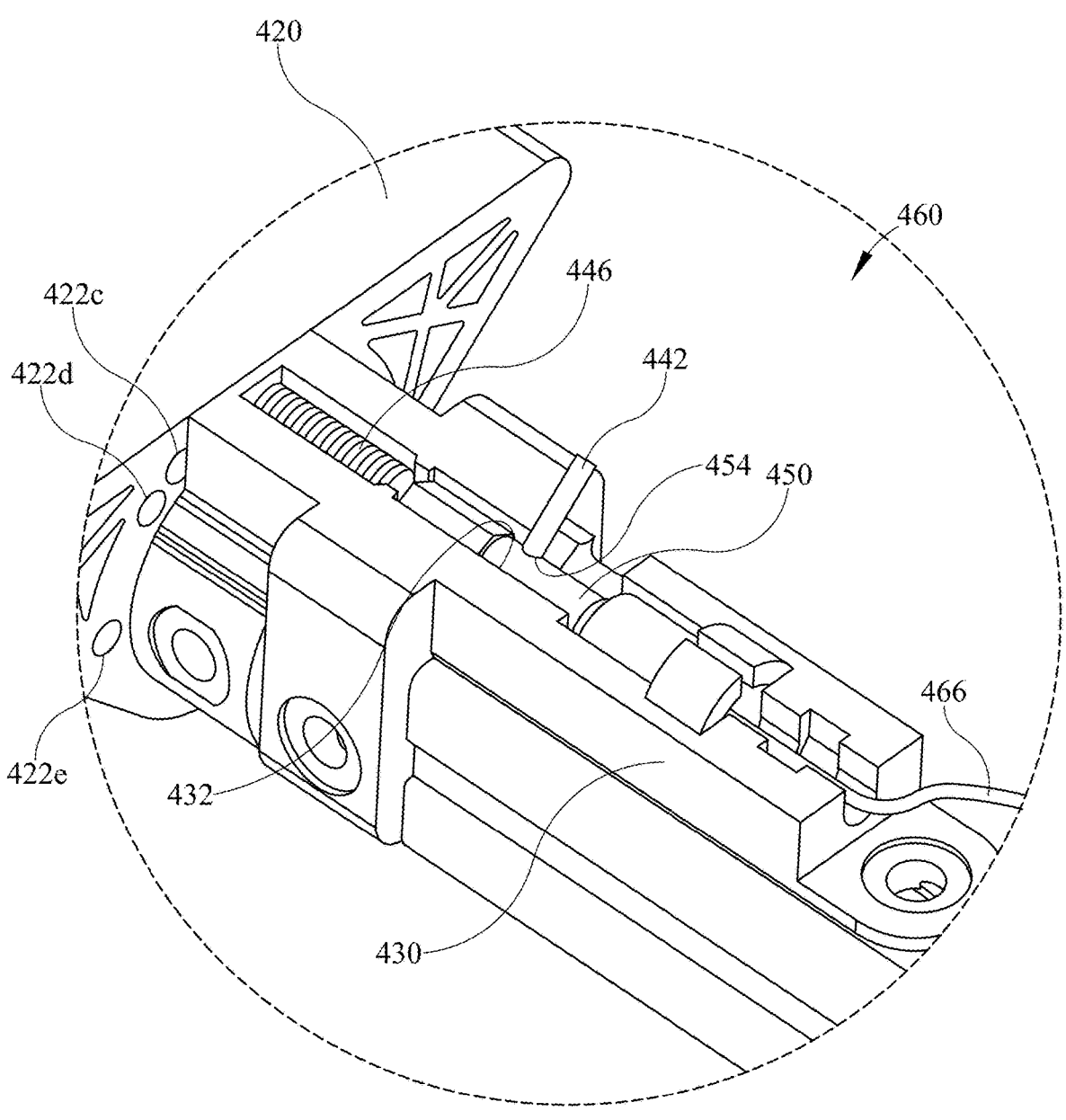
FIG. 12 is a detailed view of the portion identified in FIG. 11.
Figure 13:
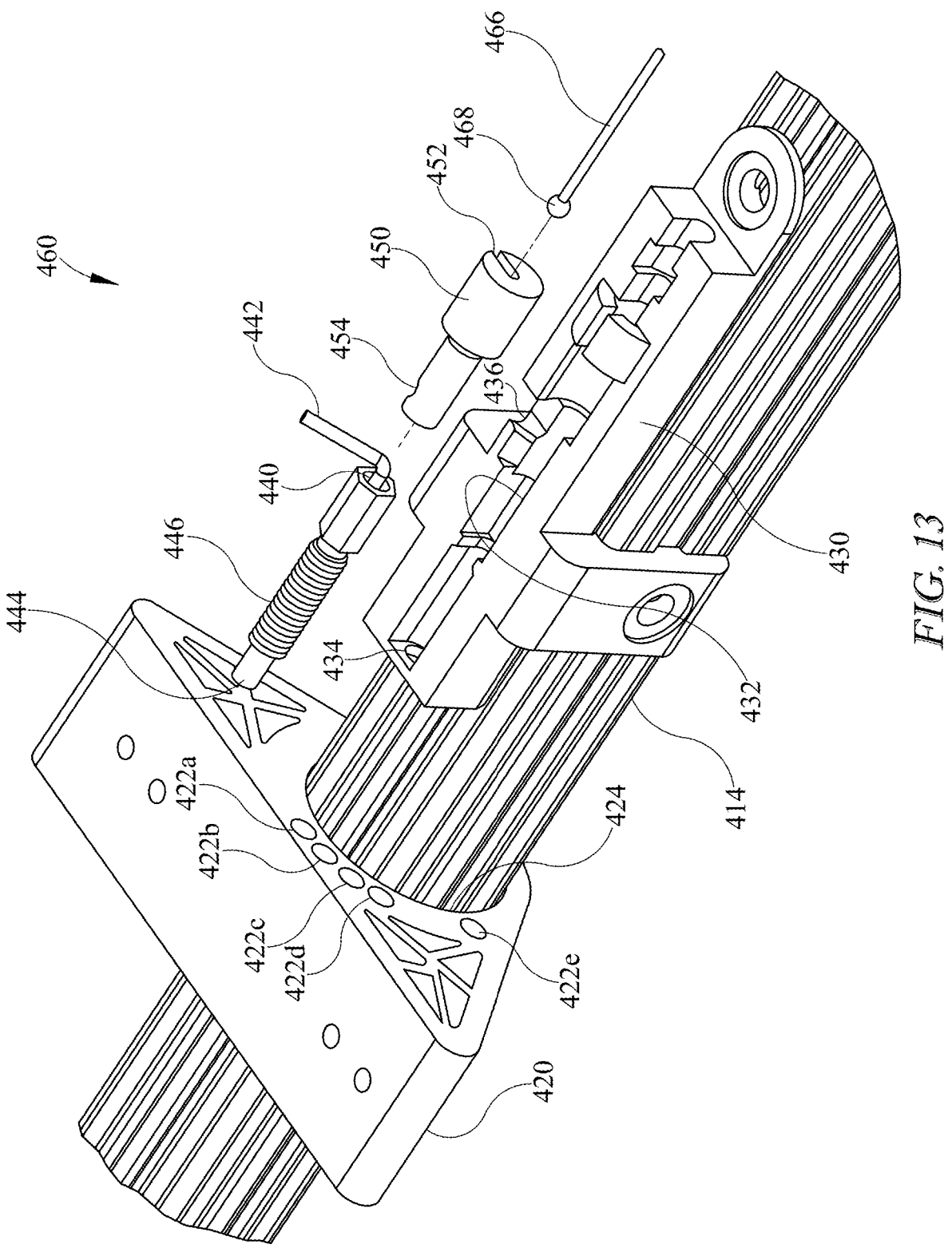
FIG. 13 is an exploded view of the components shown in FIG. 12.

Referring now to FIGS. 12-13, the spring pin housing 430 defines a contoured channel 432 within which a number of components are seated. At the side closest to the angle guide 420, a plunger pin 440 is included. The plunger pin 440 includes a bent engagement arm 442 at one end and a distal end 444 of the plunger pin 440 extends through a hole 434 (shown in FIG. 13) at the end of the spring pin housing 430 immediately adjacent to the angle guide 420. A biasing mechanism 446 (e.g., a plunger or spring) surrounds a portion of the plunger pin 440. A spring cartridge 450 is then provided. The spring cartridge 450 defines a hole 454, and, as shown in FIG. 12, the bent engagement arm 442 of the plunger pin 440 extends through this hole 454. Finally, a cable 466 (e.g., a Bowden cable) is provided with a distal end 468 of the cable 466 held within a channel 452 defined in the spring cartridge 450.

Figure 14:
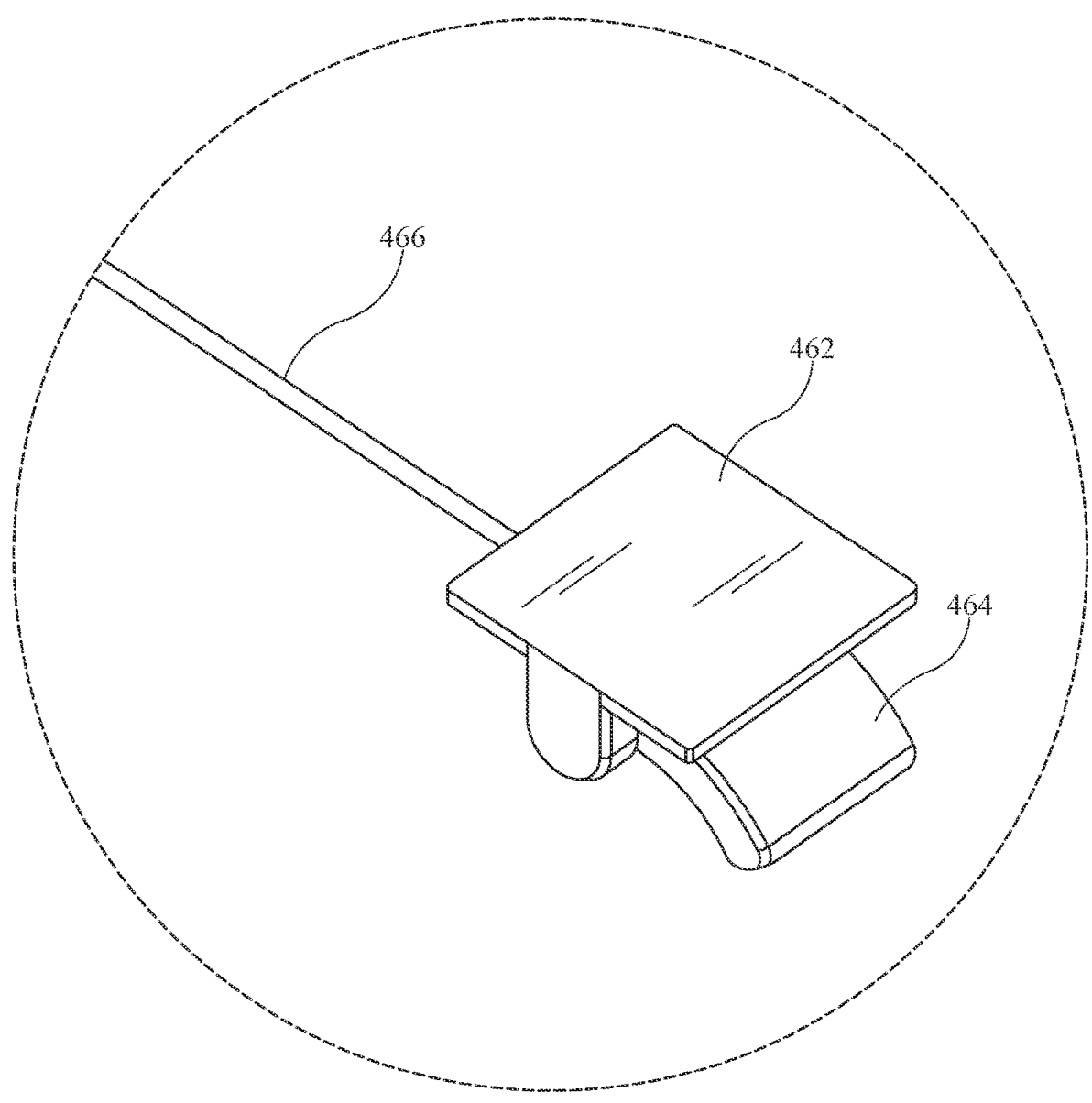
FIG. 14 is a detailed view of the portion identified in FIG. 11.

As shown in FIG. 11 but perhaps better shown in FIG. 14, a mount 462 is also provided on the underside of the desk 470. The cable 466 runs from the spring pin housing 430 up to this mount 462 and is operably connected to a paddle 464 that can rotate relative to the mount 462.

In operation, and referring now to FIGS. 11-14, a user squeezes the paddle 464 which pulls on the cable 466. The cable 466, in turn, pulls on the spring pin cartridge 450. As the bent engagement arm 442 of the plunger pin 440 is captured within the through the hole 454 of the spring pin cartridge 450, the plunger pin 440 is also pulled along with the spring pin cartridge 450 therefore moving the distal end 444 of the plunger pin 440 out of the locking holes 422a-422e. This allows the angle guides 420 (and connected desk 470) to rotate around the reinforced support bar 414. Upon releasing the paddle 464, the biasing mechanism 446 returns the plunger pin 440 to one of the locking holes 422a-422e securing the desk 470 in the desired position. In this way, the spring pin housing 430, the plunger pin 440, the biasing mechanism 446, and the spring pin cartridge 450 operate as an angle locking mechanism 460.

Figures 15A, 15B, 15C, 15D, 15E:
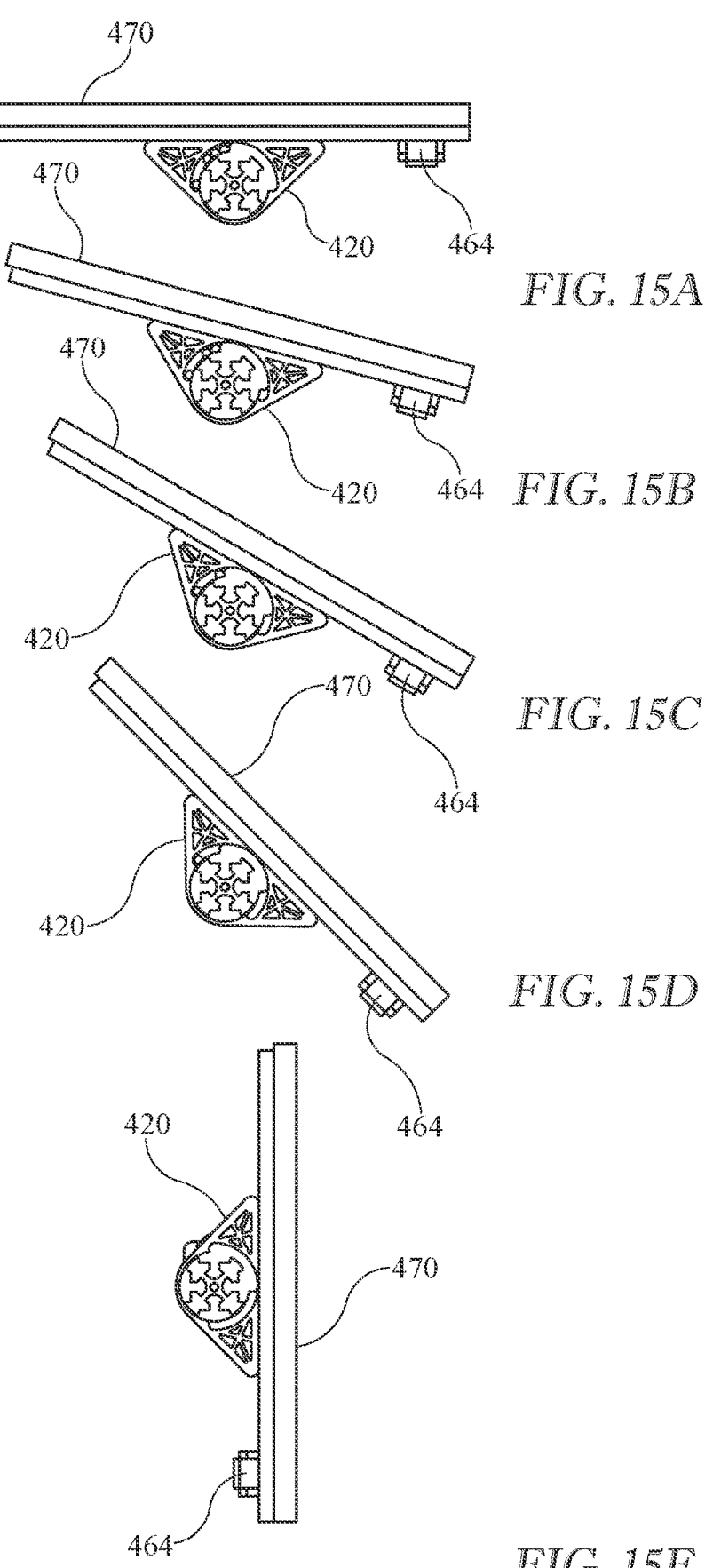
FIG. 15A FIG. 15D illustrates the desk at first angled orientation where the desk is substantially horizontal.
FIG. 15B illustrates the desk at second angled orientation.
FIG. 15C illustrates the desk at third angled orientation.
FIG. 15E illustrates the desk at fifth angled orientation where the desk is substantially vertical.

FIGS. 15A-15E illustrate the tipping of the desk 470 between a substantially horizontal orientation in FIG. 15A to a substantially vertical orientation in FIG. 15E with each angled orientation set by a corresponding locking hole 422a-422e.

Figure 16A:
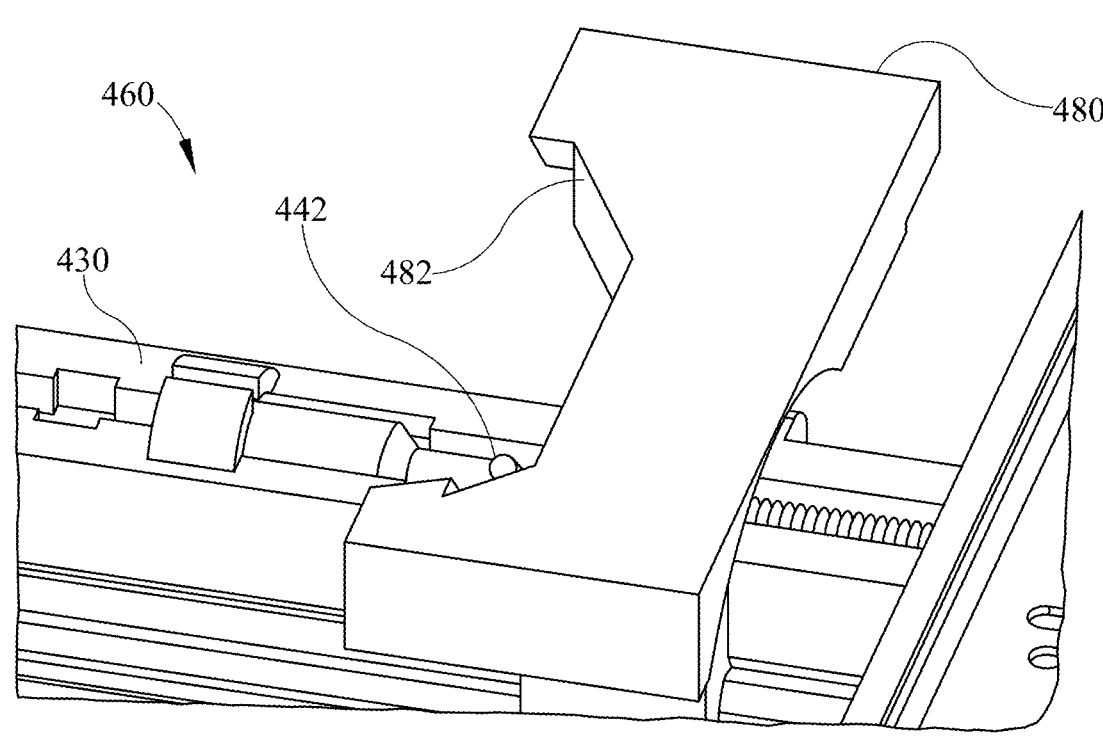
FIG. 16A illustrate an mechanism to temporarily disable the angle locking mechanism shown when the desk is fully retracted.
Figure 16B:
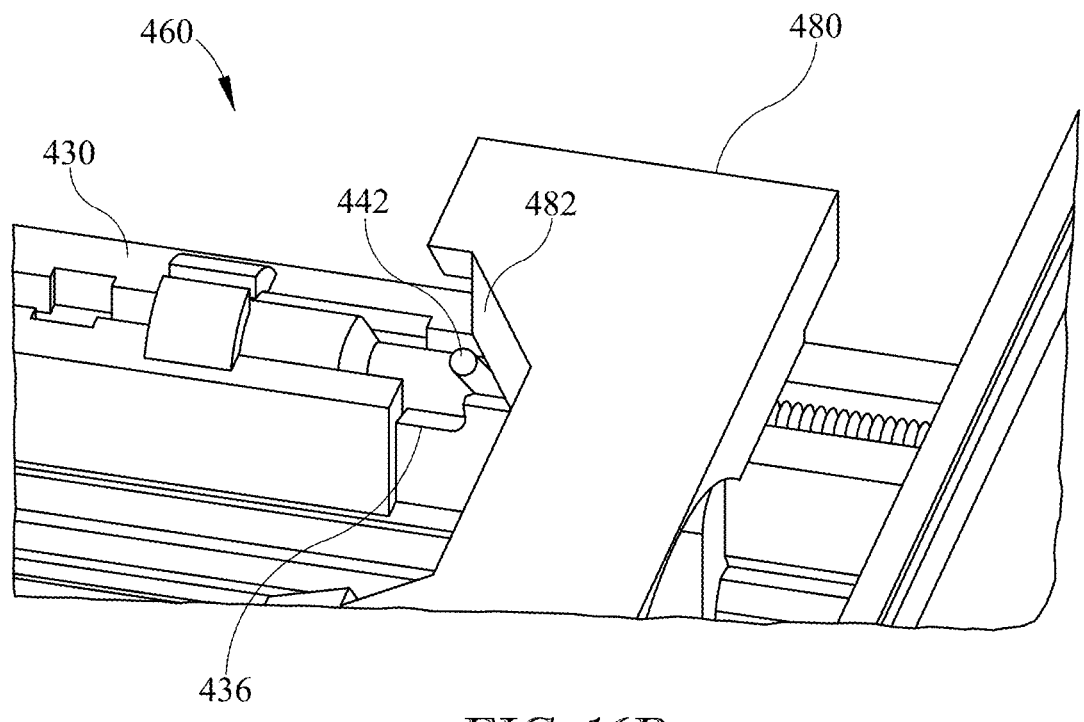
FIG. 16B illustrate the mechanism of FIG. 16A when the desk is partially pulled backward.
Figure 16C:
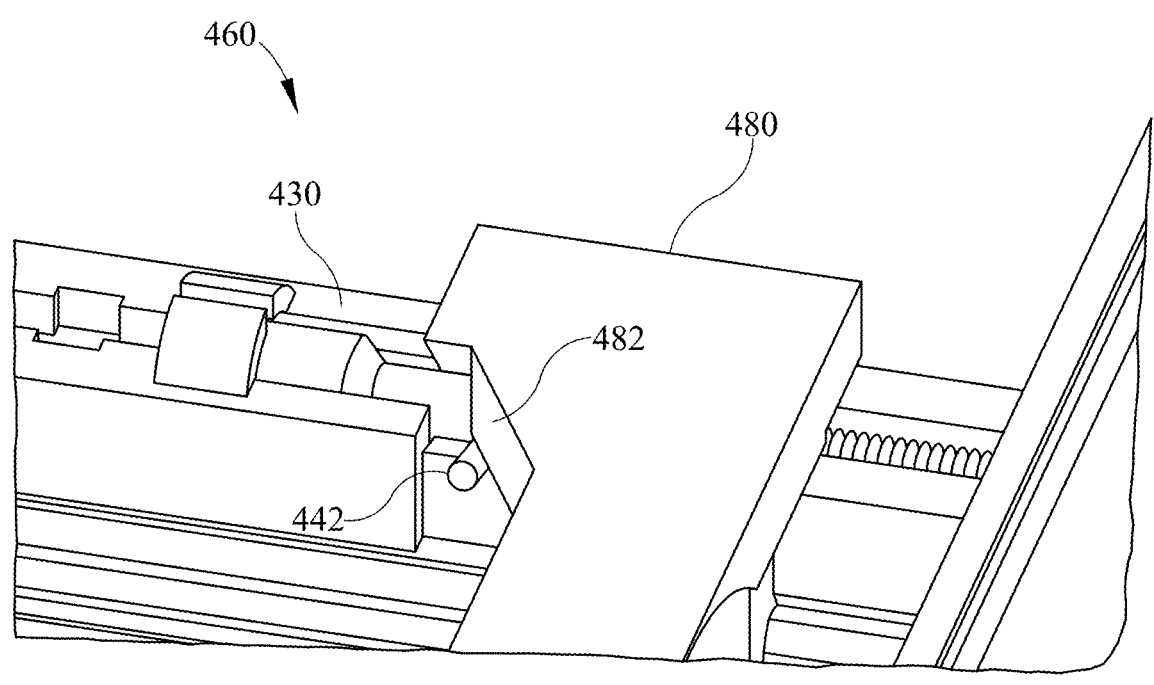
FIG. 16C illustrate the mechanism of FIG. 16A when the desk is pulled back further.
Figure 16D:
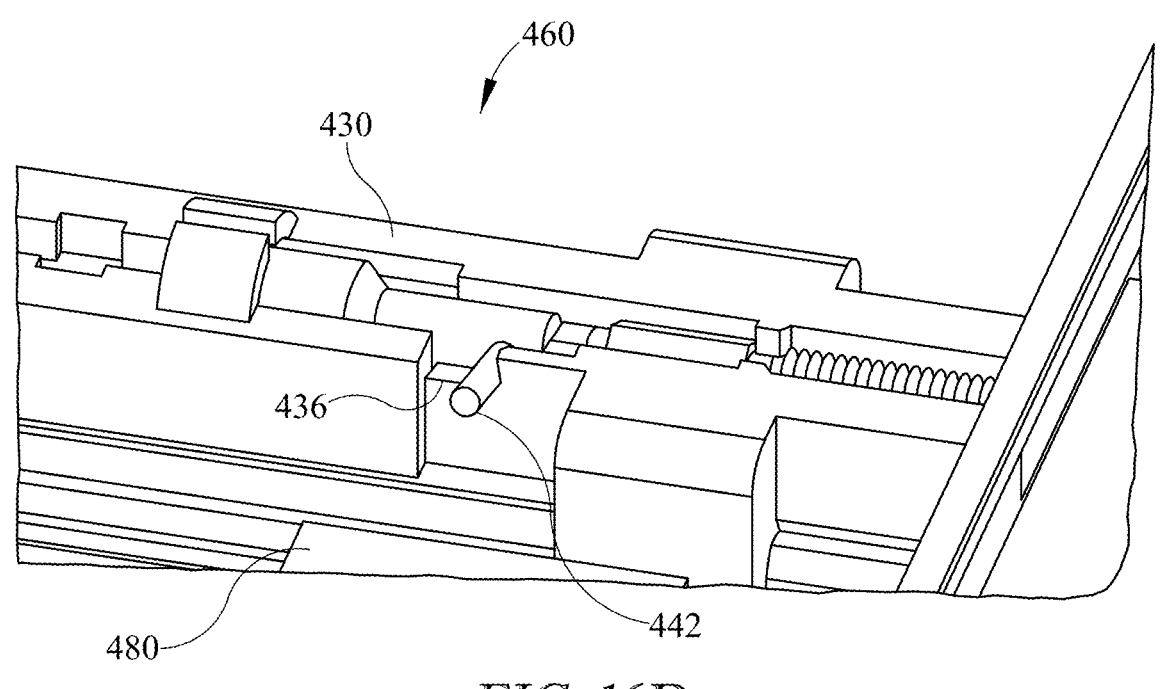
FIG. 16D illustrate the mechanism of FIG. 16A when the desk is pulled back even further.

In addition to tipping, the desk 470 is additionally capable of sliding forwards and backwards along the slides 472. However, in order to improve functionality, the exemplary desk 470 automatically disables the angle locking mechanism 460 when the desk 470 is slid forward from a fully retracted position. Referring once again to FIG. 11, but now also to FIGS. 16A-16D, the exemplary desk 470 further includes a pin guide 480 which engages the bent engagement arm 442 of the plunger pin 440 as the desk 470 is pulled back and slid forward. Specifically, as shown in FIG. 16A, when the desk is fully retracted, the engagement arm 442 rests on an outer edge of the pin housing 430 in substantially the same position as is shown in FIGS. 12-13. As such, in order for a user to rotate the desk 470, the user must squeeze the paddles 464, as discussed above. However, as shown in FIG. 16B, when the desk 470 starts to be pulled back, a first engagement surface 482 of the pin guide 480 engages the engagement arm 442 pushing the engagement arm 442 until, as is shown in FIG. 16C-16D, the engagement arm 442 falls into a cutout 436 defined in the side of the spring pin housing 430. Once the engagement arm 442 is within the cutout 436, the distal end 444 of the plunger pin 440 is no longer in any of the locking holes 422a-422e and the angle guides 420 (and connected desk 470) are free to rotate around the reinforced support bar 414. Advantageously, this allows the desk 470 to more freely move with the user, which is especially helpful when rocking in the recliner 900.

Figure 17A:
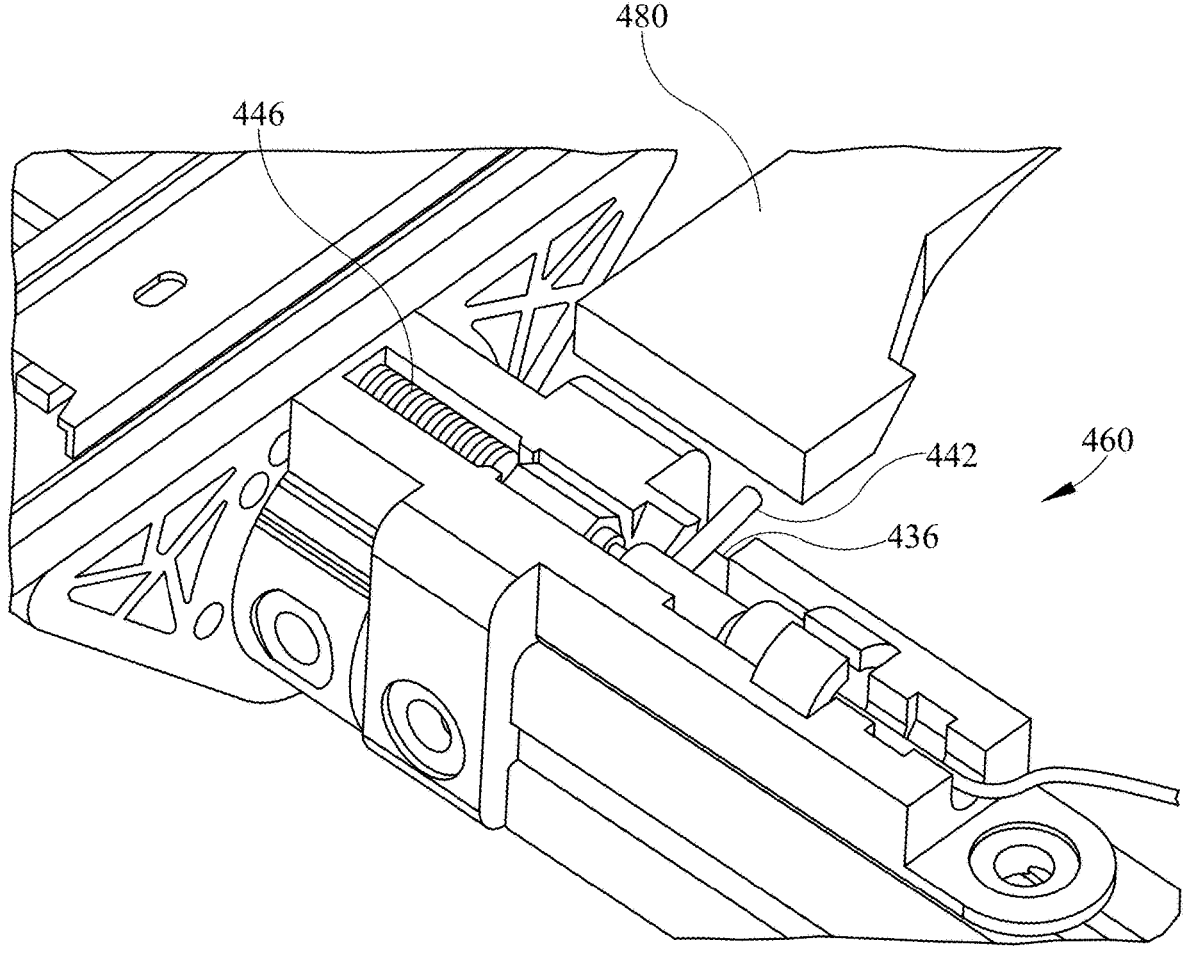
FIG. 17A illustrate the mechanism of FIG. 16A as the desk begins to be slid forward.
Figure 17B:
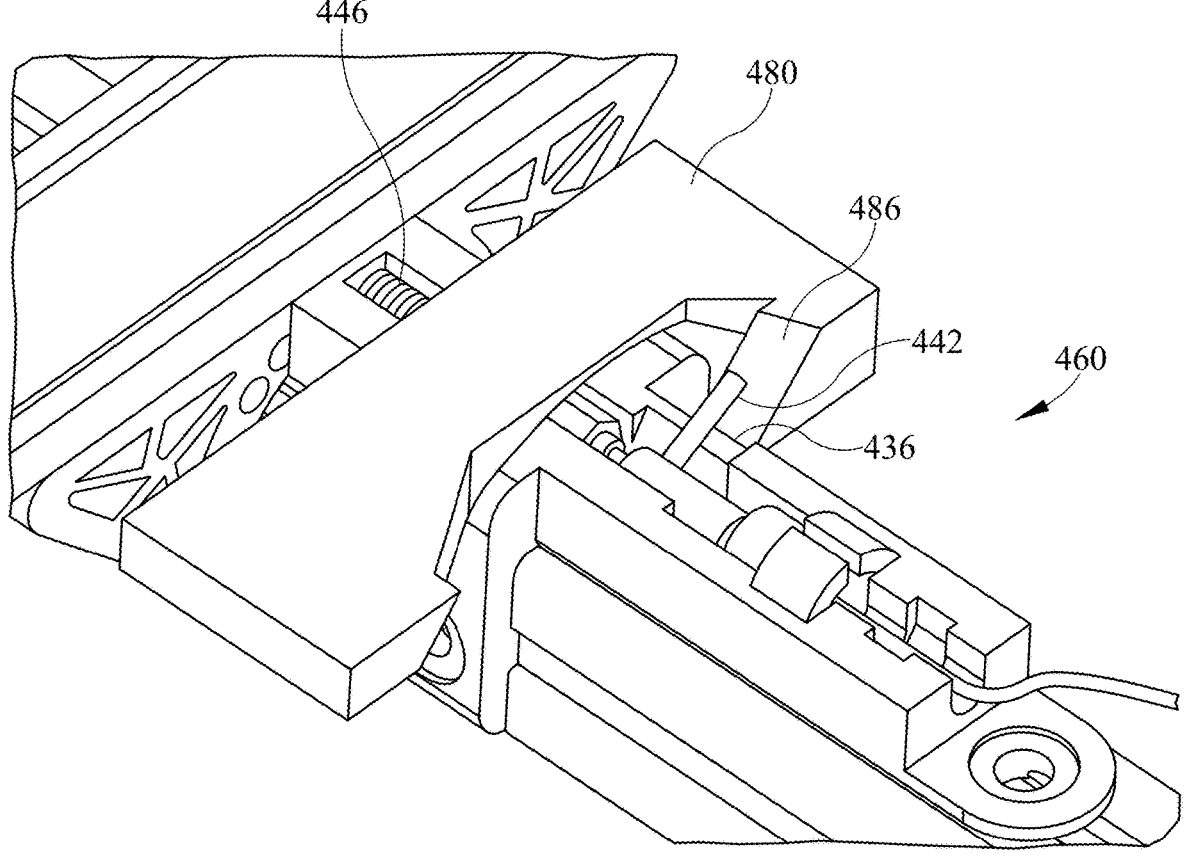
FIG. 17B illustrate the mechanism of FIG. 16A when the desk is slid forward further.
Figure 17C:
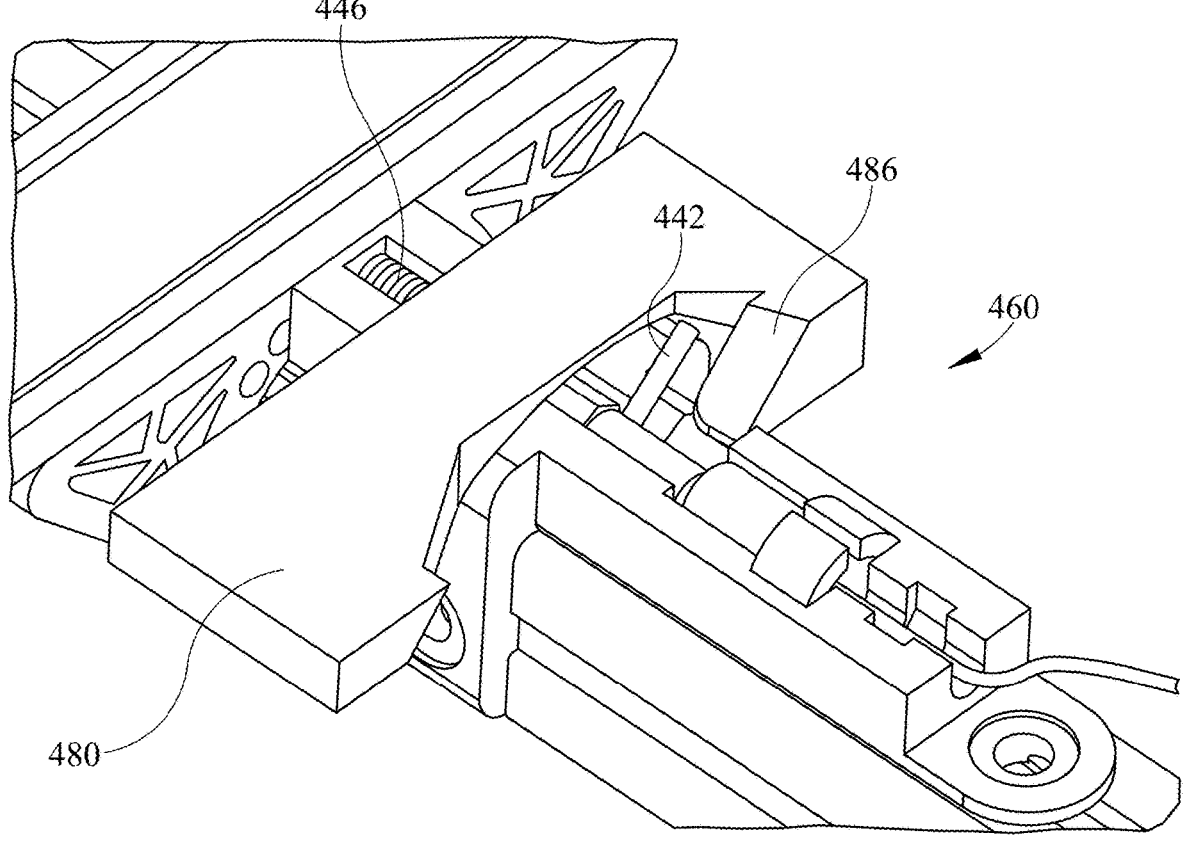
FIG. 17C illustrate the mechanism of FIG. 16A when the desk is again fully retracted.

In order to reengage the angle locking mechanism 460, the desk 470 simply needs to be pushed back into its fully retracted position. Referring now to FIGS. 17A-17C, the pin guide 480 further includes a second engagement surface 486 that pushes the engagement arm 442 upwards and out of the cutout 436 defined in the side of the spring pin housing 430. The biasing mechanism 446 returns the plunger pin 440 to one of the locking holes 422a-422e securing the desk 470 in the desired position.

However, other means of disabling the angle locking mechanism 460, particularly when the desk 470 is slid forward, are contemplated. Specifically, and referring now to FIGS. 18A-18C, in another exemplary embodiment, of the present invention, the desk 1470 is operably connected to the reinforced support bar 1414 by two angle guides 1420 and slides 1472 in substantially the same manner as the desk 470, support bar 414, angle guides 420, and slides 472 discussed above with respect to FIGS. 11-13.

Figure 18A:
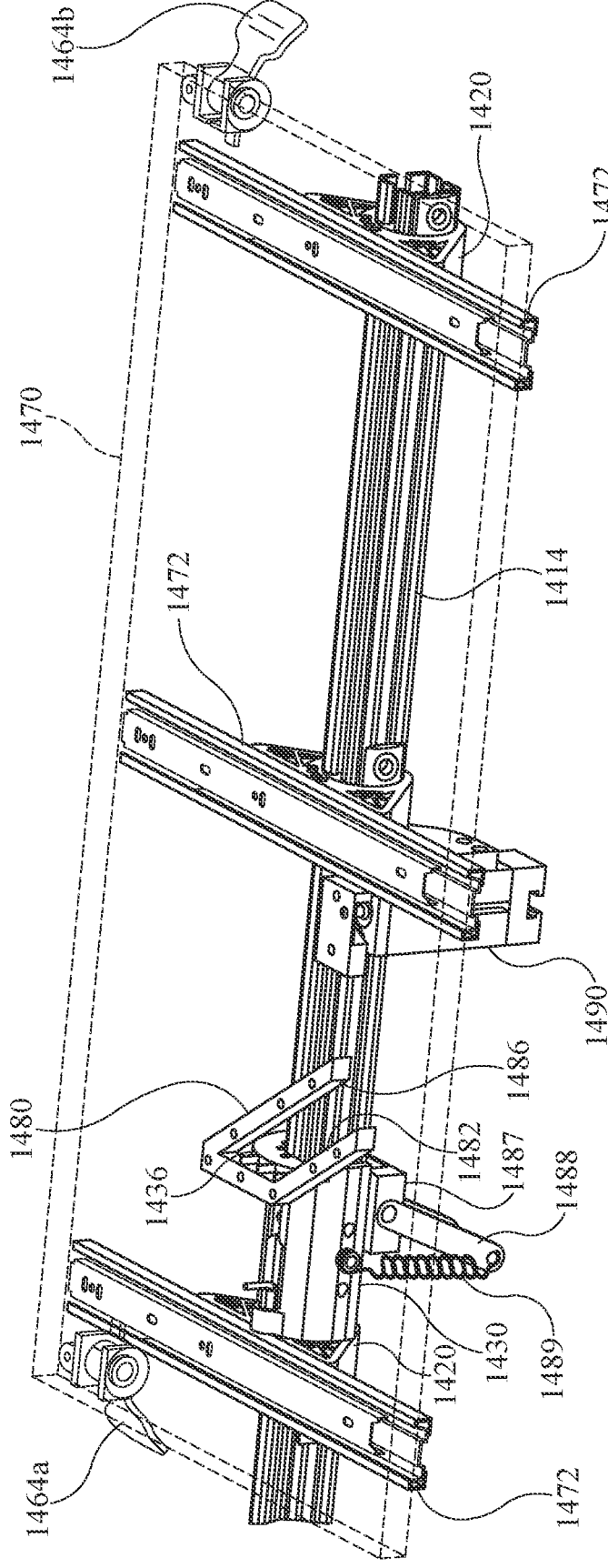
FIG. 18A illustrates an alternate mechanism to temporarily disable the angle locking mechanism shown when the desk is fully retracted.
Figure 18B:
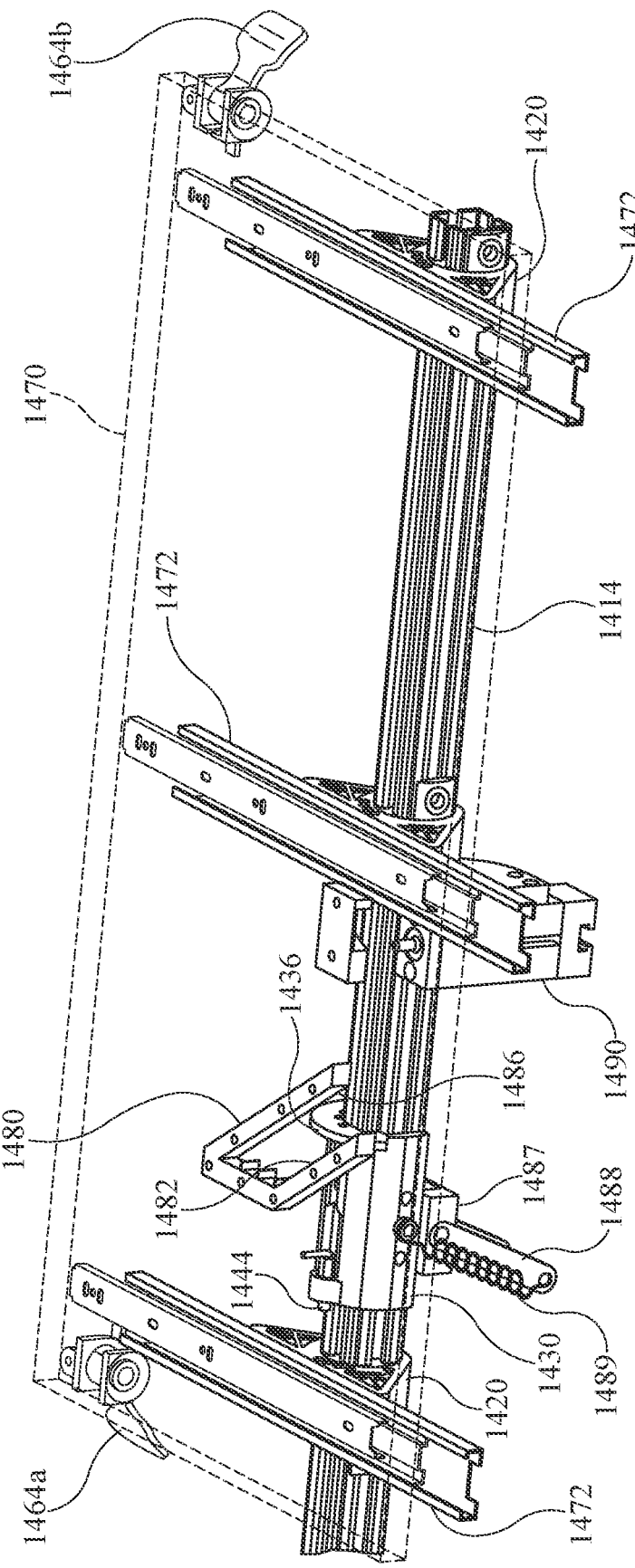
FIG. 18B illustrate the mechanism of FIG. 18A when the desk is partially pulled backward.
Figure 18C:
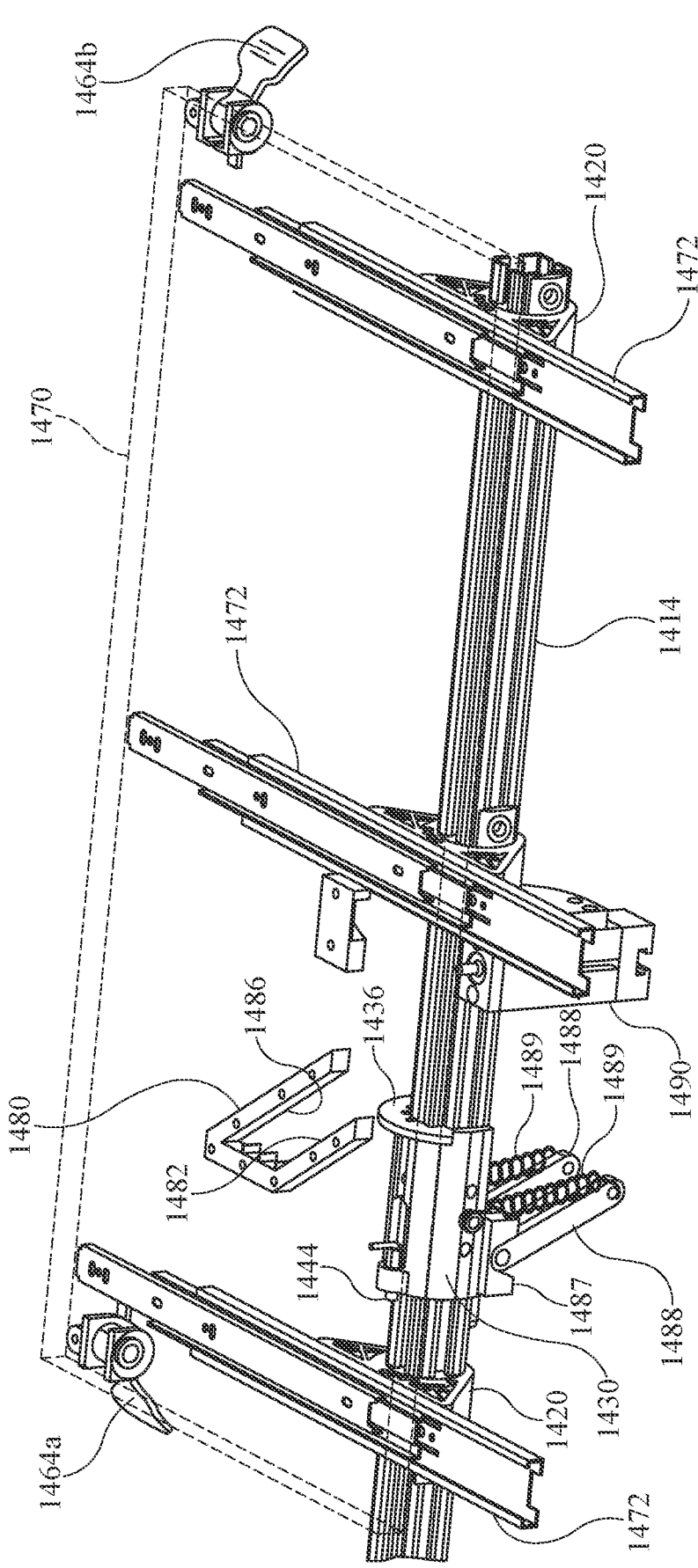
FIG. 18C illustrate the mechanism of FIG. 18A when the desk is pulled back further.

A spring pin housing 1430 is also provided on the reinforced support bar 1414 adjacent to one of the angle guides 1420 which is similar to the angle guides 420 discussed above with respect to FIGS. 11-13 except that the spring pin housing 1430 shown in FIGS. 18A-18C is not affixed to the reinforced support bar 1414 but is instead allowed to slide along the Clean Version of the Substitute Specification length of the reinforced support bar 1414. Furthermore, the spring pin housing 1430 includes an extension 1436 at the end opposite from the angle guide 1420. A U-shaped guide member 1480 is additional connected to a bottom of the desk 1470, and the guide member 1480 is configured to engage the extension 1436 of the spring pin housing 1430, as discussed below.

A lever 1488 is rotationally connected to an anchor 1487 fixed to the reinforced support bar 1414 and a spring 1489 extends between and connects the end of the lever 1488 to the spring pin housing 1430. The lever 1488 and spring 1489 operate together to bias the spring pin housing 1430 to both the left and the right position.

In operation, when the desk is fully retracted, as shown in FIG. 18A, the lever 1488 is pointing towards the angle guide 1420 such that the spring 1489 provides a biasing force on the spring pin housing 1430 towards the angle guide 1420. As such, in order for a user to rotate the desk 1470, the user must squeeze the paddles 1464, in substantially the same manner as discussed above. However, as shown in FIG. 18B, when the desk 1470 starts to slide forward, a first engagement surface 1482 of the guide member 1480 engages the extension 1436 of the spring pin housing 1430 pushing the spring pin housing 1430 away from the angle guide 1420. This causes the lever 1488 to rotate away from the angle guide 1420 until, as is shown in FIG. 18C, the lever 1488 passes its midpoint and the spring 1489 provides a biasing force away from the angle guide 1420. As shown in FIGS. 18B-18C, when the spring pin housing 1430 moves away from the angle guide 1420, the distal end 1444 of the plunger pin 1440 is no longer in any of the locking holes and the angle guides 1420 (and connected desk 1470) are free to rotate around the reinforced support bar 1414.

In order to reengage the locking mechanism, the desk 1470 simply needs to be pushed back into its fully retracted position. Specifically, the guide member 1480 includes a second engagement surface 1486 that engages the extension 1436 of the spring pin housing 1430 pushing the spring pin housing 1430 back towards the angle guide 1420. Operation of the lever 1488 and spring 1489 is simply the reverse of what is discussed above. After the spring pin housing 1430 is once again biased towards the angle guide 1420, the plunger pin 1440 can once again be used to prevent the desk 1470 from rotating. Rather than using the lever 1488 and spring 1489 discussed above, in some other exemplary embodiments, a spring plunger affixed to the spring pin housing is used in conjunction with an angled surfaced attached to the desk to operate in substantially the same manner.

Figure 19:
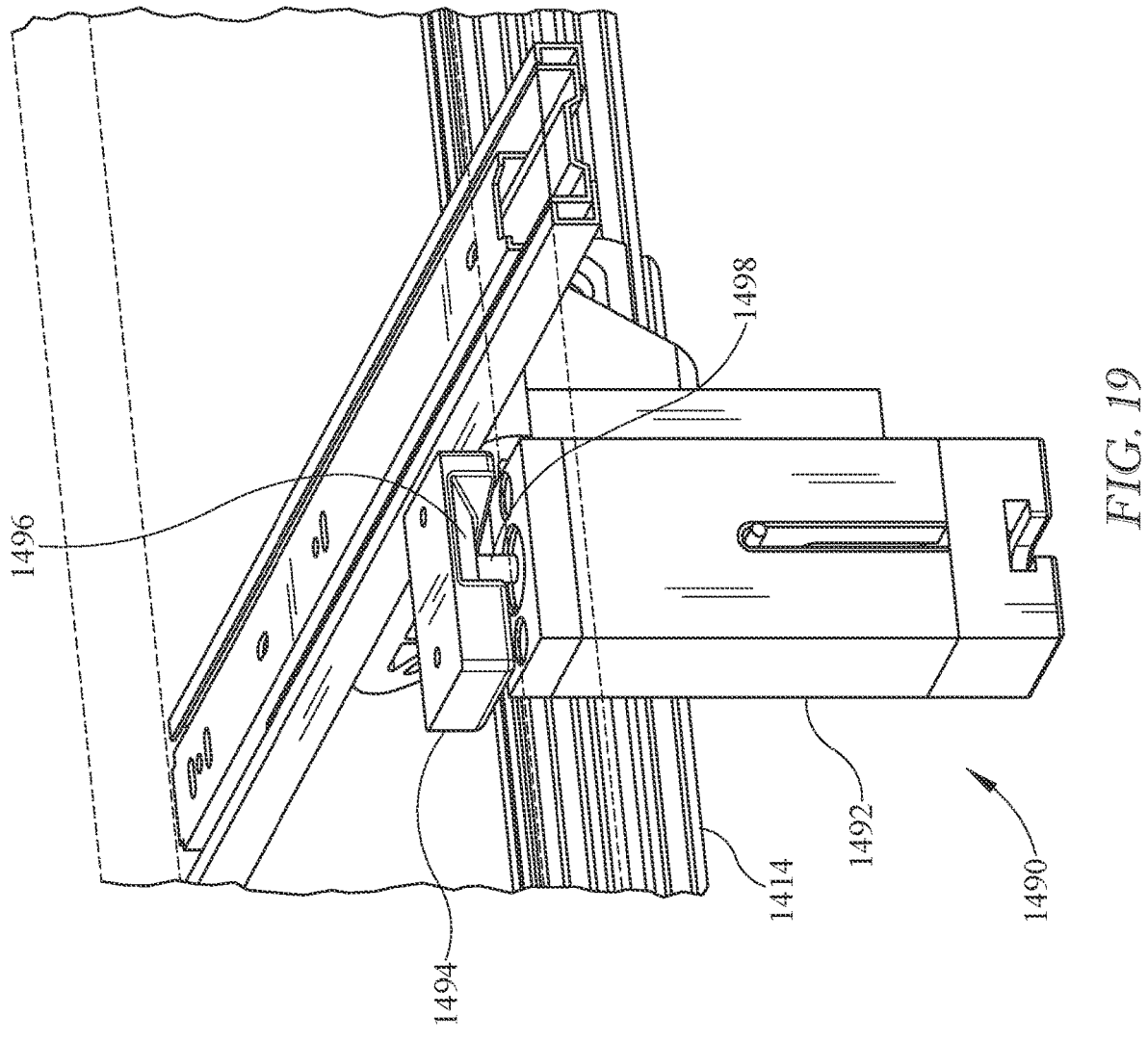
FIG. 19 is a detailed view of the slide lock mechanism shown in FIGS. 18A-18C.

In the exemplary embodiment shown in FIGS. 18A-18C, there is only one spring pin housing 1430 operated by a corresponding paddle 1464a. However, there is still a second paddle 1464b which is used to operate a desk slide lock 1490. Referring still to FIGS. 18A-18C, but now also to FIG. 19, the desk slide lock 1490 includes a base 1492 that is fixed to the reinforced support bar 1414 and a locking member 1494 that is fixed to the desk 1470. A retractable pin 1498 is biased upward from the base 1492 to engage the locking member 1494 when the desk 1470 is fully retracted to prevent the desk 1470 from sliding. Although not expressly shown, a cable extends between the pin 1498 and the second paddle 1464*b*, such that when a user squeezes the second paddle 1464*b*, it pulls on the cable which, in turn, retracts the pin 1498. When the pin 1498 is retracted, the desk 1470 is capable of sliding freely. The locking member 1494 includes a sloped surface 1496 such that, when the desk is returned from an extended position, the sloped surface 1496 will force the pin 1498 downward to allow the locking member 1494 to pass over the pin 1498 thereby locking the desk 1470 back in its fully retracted position.

One of ordinary skill in the art will recognize that additional embodiments and implementations are also possible without departing from the teachings of the present invention. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. An adjustable desk and monitor mount assembly, comprising:

an L-shaped base having a first leg configured to be positioned behind a chair and a second leg configured to be positioned along a side of the chair;

a vertical support extending upward from the second leg;

a traveling housing configured to travel along the vertical support;

a linear actuator extending between the base and the traveling housing and configured to control the height of the traveling housing;

a desk arm pivotally connected to the traveling housing;

a desk operably connected to the desk arm;

a monitor arm having a first end with a counterweight and a second end with a lateral extension, the monitor arm rotationally connected to the vertical support at a point between the first end and the second end; and a monitor mount operably connected to the monitor arm.

2. The assembly of claim 1, wherein the desk arm is movable between a first position in which the desk arm is configured to be positioned near the chair and a second position in which the desk arm is configured to be positioned away from the chair.

3. The assembly of claim 1, wherein the desk is connected to the desk arm to allow the desk to rotate.

4. The assembly of claim 3, further comprising an angle locking mechanism configured to secure the desk at a plurality of rotational positions.

5. The assembly of claim 1, wherein the desk is connected to the desk arm to allow the desk to slide along an axis perpendicular to the desk arm.

6. The assembly of claim 5, wherein the desk is connected to the desk arm to allow the desk to rotate;

wherein an angle locking mechanism is configured to secure the desk at a plurality of rotational positions; and wherein, when the desk is slid along the axis out of a fully retracted position, the angle locking mechanism is disabled.

7. The assembly of claim 1, wherein the monitor arm is moveable between a first position in which the monitor arm is positioned in front of the chair and a second position in which the monitor arm is positioned above the chair.

8. The assembly of claim 1, further including a monitor tipping mechanism configured to tip the monitor mount about an axis parallel to the lateral extension of the monitor arm.

9. The assembly of claim 8, wherein the monitor tipping mechanism includes:

a motor;

a lead screw turned by the motor;

a follower defining a threaded hole that engages threading of the lead screw such that, when the motor turns the lead screw, the follower moves longitudinally along a length of the lead screw; and a cam defining a spiraling channel, the monitor mount affixed to the cam;

wherein the follower travels within the channel such that as the follower moves along the length of the lead screw, the follower causes the cam to rotate.

10. An adjustable desk and monitor mount assembly, comprising:

a base configured to be positioned around a chair;

a vertical support extending upward from the second leg;

a desk arm pivotally connected to the vertical support;

a monitor arm having a first end with a counterweight and a second end with a lateral extension, the monitor arm rotationally connected to the vertical support at a point between the first end and the second end;

a desk operably connected to the desk arm, the desk arm movable between a first position in which the desk arm is configured to be positioned near the chair and a second position in which the desk arm is configured to be positioned away from the chair; and a monitor mount operably connected to the monitor arm;

wherein the desk is connected to the desk arm to allow the desk to slide along an axis perpendicular to the desk arm;

wherein the desk is connected to the desk arm to allow the desk to rotate;

wherein an angle locking mechanism is configured to secure the desk at a plurality of rotational positions; and wherein, when the desk is slid along the axis out of a fully retracted position, the angle locking mechanism is disabled.

11. An adjustable desk and monitor mount assembly, comprising:

a base configured to be positioned around a chair;

a vertical support extending upward from the second leg;

a desk arm pivotally connected to the vertical support;

a monitor arm having a first end with a counterweight and a second end with a lateral extension, the monitor arm rotationally connected to the vertical support at a point between the first end and the second end;

a desk operably connected to the desk arm, the desk arm movable between a first position in which the desk arm is configured to be positioned near the chair and a second position in which the desk arm is configured to be positioned away from the chair;

a monitor mount operably connected to the monitor arm; and a monitor tipping mechanism including:

a motor, a lead screw turned by the motor, a follower defining a threaded hole that engages threading of the lead screw such that, when the motor turns the lead screw, the follower moves longitudinally along a length of the lead screw, and a cam defining a spiraling channel, the monitor mount affixed to the cam;

wherein the follower travels within the channel such that as the follower moves along the length of the lead screw, the follower causes the cam to rotate.

* * * * *